US012236778B2

(12) United States Patent
Hou

(10) Patent No.: US 12,236,778 B2
(45) Date of Patent: Feb. 25, 2025

(54) INFORMATION PROCESSING METHOD AND APPARATUS, DEVICE, AND COMPUTER-READABLE STORAGE MEDIUM

(71) Applicant: Tencent Technology (Shenzhen) Company Limited, Guangdong (CN)

(72) Inventor: Chen Hou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 29 days.

(21) Appl. No.: 17/974,289

(22) Filed: Oct. 26, 2022

(65) Prior Publication Data

US 2023/0046868 A1 Feb. 16, 2023

Related U.S. Application Data

(63) Continuation of application No. PCT/CN2021/118817, filed on Sep. 16, 2021.

(30) Foreign Application Priority Data

Oct. 14, 2020 (CN) ......................... 202011100079.7

(51) Int. Cl.
*G08G 1/01* (2006.01)
*G08G 1/0962* (2006.01)

(52) U.S. Cl.
CPC ......... *G08G 1/0133* (2013.01); *G08G 1/0112* (2013.01); *G08G 1/09623* (2013.01)

(58) Field of Classification Search
None
See application file for complete search history.

(56) References Cited

U.S. PATENT DOCUMENTS

| | | | | |
|---|---|---|---|---|
| 9,528,842 | B2 * | 12/2016 | Braeuchle | G08G 1/0133 |
| 9,922,374 | B1 * | 3/2018 | Vose | G08G 1/0129 |

(Continued)

FOREIGN PATENT DOCUMENTS

| | | | |
|---|---|---|---|
| CN | 105741590 | A | 7/2016 |
| CN | 110766258 | A | 2/2020 |

(Continued)

OTHER PUBLICATIONS

International Search Report of PCT application PCT/CN2021/118817 dated Sep. 16, 2021, 11 pages.

*Primary Examiner* — Muhammad Adnan
(74) *Attorney, Agent, or Firm* — Crowell & Moring LLP

(57) ABSTRACT

A target dangerous travel scene existing on a target road section is acquired. Reference information corresponding to the target road section is acquired. The reference information is determined according to a detection record corresponding to each of N dangerous travel scenes detected on the target road section within a target time period. N is an integer greater than 1. The detection record corresponds to each dangerous travel scene being used for reflecting time at which the corresponding dangerous travel scene is detected. An associated dangerous travel scene correlated to the target dangerous travel scene from the N dangerous travel scenes is determined according to the reference information. A prompt operation according to the target dangerous travel scene and the associated dangerous travel scene is performed.

19 Claims, 6 Drawing Sheets

(56) References Cited

U.S. PATENT DOCUMENTS

| | | | | |
|---|---|---|---|---|
| 10,395,526 | B1 * | 8/2019 | Slusar | G08G 1/0116 |
| 11,367,346 | B2 * | 6/2022 | Kadar | G08G 1/0112 |
| 2005/0264404 | A1 * | 12/2005 | Franczyk | G08G 1/09675 340/936 |
| 2012/0025969 | A1 * | 2/2012 | Dozza | G08G 1/167 340/463 |
| 2012/0078509 | A1 * | 3/2012 | Choi | G01C 21/3415 701/423 |
| 2012/0280835 | A1 * | 11/2012 | Raz | G08G 1/0129 340/905 |
| 2013/0082874 | A1 * | 4/2013 | Zhang | G01S 19/48 340/936 |
| 2013/0279392 | A1 * | 10/2013 | Rubin | H04W 4/12 370/312 |
| 2014/0222306 | A1 * | 8/2014 | Wanami | B60R 21/0136 701/70 |
| 2014/0328241 | A1 * | 11/2014 | Subramanian | H04W 72/30 370/312 |
| 2015/0185036 | A1 * | 7/2015 | Braeuchle | G08G 1/096741 701/538 |
| 2015/0375756 | A1 * | 12/2015 | Do | B60W 30/08 701/1 |
| 2016/0080163 | A1 * | 3/2016 | Taylor | H04W 4/024 370/312 |
| 2016/0093210 | A1 * | 3/2016 | Bonhomme | G08G 1/0141 340/905 |
| 2016/0144853 | A1 * | 5/2016 | Stenneth | G08G 1/096758 701/1 |
| 2016/0150070 | A1 * | 5/2016 | Goren | H04M 1/72421 455/418 |
| 2016/0343250 | A1 * | 11/2016 | Yoshii | G08G 1/017 |
| 2016/0379485 | A1 * | 12/2016 | Anastassov | G08G 1/0129 701/117 |
| 2017/0043717 | A1 * | 2/2017 | Heiman | G08G 1/096775 |
| 2019/0019256 | A1 * | 1/2019 | Harish | G06F 9/542 |
| 2019/0108753 | A1 * | 4/2019 | Kaiser | G08G 1/0141 |
| 2019/0333373 | A1 * | 10/2019 | Fang | G08G 1/096775 |
| 2020/0019161 | A1 * | 1/2020 | Stenneth | G08G 1/0112 |
| 2020/0108835 | A1 * | 4/2020 | Suzuki | G07C 5/008 |
| 2020/0226920 | A1 * | 7/2020 | Takenaka | G08G 1/096775 |
| 2020/0286378 | A1 * | 9/2020 | Wang | G08G 1/0129 |
| 2021/0049551 | A1 * | 2/2021 | Bader | G06Q 30/0282 |
| 2022/0301427 | A1 * | 9/2022 | Ueno | G08G 1/096783 |
| 2023/0005366 | A1 * | 1/2023 | Yu | G08G 1/096725 |
| 2023/0046868 | A1 * | 2/2023 | Hou | G08G 1/0129 |

FOREIGN PATENT DOCUMENTS

| | | | |
|---|---|---|---|
| CN | 110767285 | A | 2/2020 |
| CN | 111062240 | A | 4/2020 |
| CN | 111231983 | A | 6/2020 |
| CN | 112164225 | A | 1/2021 |
| JP | 2011227571 | A | 11/2011 |

* cited by examiner

INFORMATION PROCESSING METHOD AND APPARATUS, DEVICE, AND COMPUTER-READABLE STORAGE MEDIUM

RELATED APPLICATION

This application is a continuation of PCT/CN2021/118817 filed Sep. 16, 2021, which claims priority to Chinese Patent Application No. 202011100079.7 filed on Oct. 14, 2020, which is incorporated herein by reference in its entirety.

FIELD OF THE TECHNOLOGY

The present subject matter relates to an intelligent transportation technology of artificial intelligence, and more particularly, to an information processing method and apparatus, a device, a computer program product, and a non-transitory computer-readable storage medium.

BACKGROUND OF THE DISCLOSURE

With the research and progress of artificial intelligence technologies, the artificial intelligence technologies have been researched and applied in many fields, such as a common intelligent home, an intelligent wearable device, a virtual assistant, an intelligent speaker, intelligent transportation, and intelligent medical care. The field of intelligent transportation may include intelligent driving of vehicles, such as unmanned driving and automatic driving. As an assistant technology in intelligent driving, the main content of the Internet of vehicles may be that an on-board device on a vehicle effectively utilizes dynamic information of all vehicles in an information network platform by using a wireless communication technology, to provide different functional services during running of the vehicle.

Using a new generation of information communication technology, vehicle-to-cloud platform, vehicle-to-vehicle, vehicle-to-road, vehicle-to-people and in-vehicle all-round network links may be realized by the Internet of vehicles, which mainly realizes the integration of three networks, i.e. the integration of an in-vehicle network, a vehicle-between-vehicle network and on-board mobile Internet. When the vehicle is traveling, a cloud platform of the Internet of vehicles provides travel guidance for the vehicle according to road conditions detected on a travel road section of the vehicle, for example, prompting to travel away from accident black spots, etc. Then, in the field of intelligent transportation, how to process the information obtained from the platform of the Internet of vehicles by vehicle devices has become a hot research issue.

SUMMARY

Examples of the present subject matter provide an information processing method and apparatus, a device, a computer program product, and a non-transitory computer-readable storage medium. According to a dangerous travel scene, an associated dangerous travel scene correlated to a certain dangerous travel scene may be determined to facilitate a safe travel prompt and improve travel safety.

An example of the present subject matter provides an information processing method. The method includes: acquiring a target dangerous travel scene existing on a target road section; acquiring reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene is detected; and determining an associated dangerous travel scene correlated to the target dangerous travel scene from the N dangerous travel scenes according to the reference information.

An example of the present subject matter provides an information processing apparatus. The apparatus includes: an acquisition unit, configured to acquire a target dangerous travel scene existing on a target road section; the acquisition unit, further configured to acquire reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene is detected; and a processing unit, configured to determine an associated dangerous travel scene correlated to the target dangerous travel scene from the N dangerous travel scenes according to the reference information.

An example of the present subject matter provides an information processing device. The information processing device includes: a processor, adapted to implement one or more instructions; and a computer storage medium, storing one or more instructions, the one or more instructions being suitable to be loaded by the processor to perform the following steps: acquiring a target dangerous travel scene existing on a target road section; acquiring reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene is detected; and determining an associated dangerous travel scene correlated to the target dangerous travel scene from the N dangerous travel scenes according to the reference information.

An example of the present subject matter provides a computer-readable storage medium, storing a computer program instruction, the computer program instruction, when executed by a processor, being configured to perform the following steps: acquiring a target dangerous travel scene existing on a target road section; acquiring reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene is detected; and determining an associated dangerous travel scene correlated to the target dangerous travel scene from the N dangerous travel scenes according to the reference information.

An example of the present subject matter provides a computer program product or a computer program, including a computer instruction, the computer instruction being stored in a non-transitory computer-readable storage medium. A processor of an information processing device reads the computer instruction from the non-transitory computer-readable storage medium. The processor executes the computer instruction for: acquiring a target dangerous travel scene existing on a target road section; acquiring reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene is detected; and determining an associated dangerous travel scene correlated to the target dangerous travel scene from the N dangerous travel scenes according to the reference information.

This example of the present subject matter has the following beneficial effects: In the examples of the present subject matter, when transport means travels on a target road section, a target dangerous travel scene existing on the target road section is acquired. Further, reference information corresponding to the target road section is acquired, and an associated dangerous travel scene correlated to the target dangerous travel scene is determined from N dangerous travel scenes according to the reference information. In the above process, an associated dangerous travel scene correlated to a target dangerous travel scene may be determined according to reference information on a target road section, so that when a dangerous travel scene needs to be prompted, not only the existence of the target dangerous travel scene may be prompted, but also the associated dangerous travel scene associated with the target dangerous travel scene may be prompted. Prompting more dangerous travel scenes may avoid more accidents, and may improve the travel safety of transport means.

DETAILED DESCRIPTION

Figure 1A:
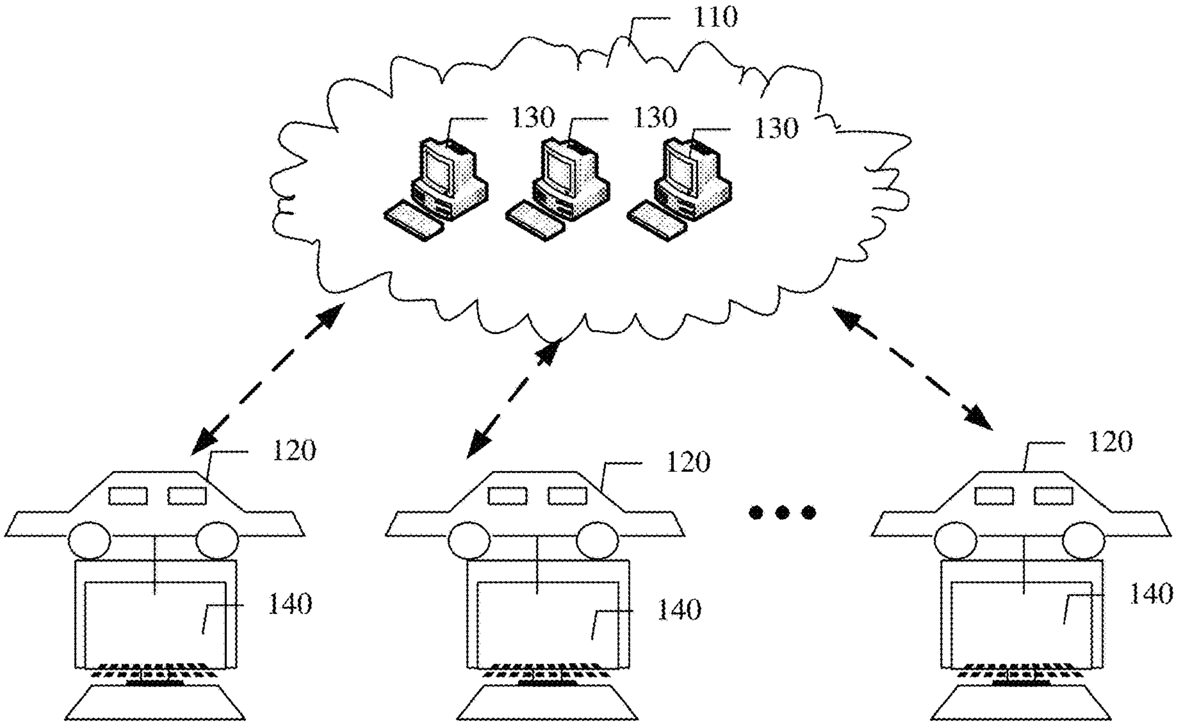
FIG. 1*a* is a schematic structural diagram of an information processing system according to an example of the present subject matter.

To make the objectives, technical solutions, and advantages of the present subject matter clearer, the following describes the present subject matter in further detail with reference to the accompanying drawings. The described examples are not to be considered as a limitation to the present subject matter. All other examples obtained by a person of ordinary skill in the art without creative efforts shall fall within the protection scope of the present subject matter.

In the following descriptions, related "some examples" describe a subset of all possible examples. However, it may be understood that the "some examples" may be the same subset or different subsets of all the possible examples, and may be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the examples of the present subject matter described herein may be implemented in a sequence in addition to the sequence shown or described herein. In the following description, the involved term "plurality of" means at least two.

Unless otherwise defined, meanings of all technical and scientific terms used in this specification are the same as those usually understood by a person skilled in the art to which the present subject matter belongs. Terms used in this specification are merely intended to describe objectives of the examples of the present subject matter, but are not intended to limit the present subject matter.

With the research and progress of artificial intelligence technologies, the artificial intelligence technologies have been researched and applied in many fields, such as an intelligent home, an intelligent wearable device, an intelligent speaker, and intelligent transportation. An information processing scheme provided by the examples of the present subject matter mainly relates to the field of intelligent transportation in artificial intelligence. The technical solution in the examples of the present subject matter will be described clearly and completely below with reference to the drawings in the examples of the present subject matter.

An intelligent vehicle infrastructure cooperative system (IVICS), referred to as a vehicle infrastructure cooperative system, is a development direction of an intelligent transportation system (ITS). A vehicle-road collaboration system may adopt advanced wireless communication and new-generation Internet technologies to comprehensively implement dynamic real-time information interaction of vehicle-to-vehicle, vehicle-to-road, and perform active vehicle safety control and road collaboration management based on acquisition and integration of full-time and space-time dynamic traffic information, thus fully realizing effective collaboration of people, vehicles and roads, ensuring traffic safety and improving traffic efficiency, thereby forming a safe, efficient, and environmentally friendly road traffic system.

Referring to FIG. 1*a*, a schematic structural diagram of an information processing system according to an example of the present subject matter is shown. The information processing system may be implemented as a vehicle infrastructure cooperative system, and in the information processing system shown in FIG. 1*a*, an example is given in which transport means may be a vehicle. The information processing system shown in FIG. 1*a* may include a travel management device 110 of a vehicle and at least one vehicle 120.

The travel management device 110 may be composed of at least one server 130. The server 130 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In some examples, at least one vehicle 120 may correspond to an on-board device 140. The on-board device 140 may be any one or more of a smart phone, a tablet computer, a notebook computer, a smart watch, and other terminal devices.

The interaction between the travel management device 110 and the vehicle 120 essentially refers to the interaction between the travel management device 110 and the on-board device 140 in the vehicle 120. In some examples, the on-board device 140 in the vehicle 120 may monitor the travel of the vehicle 120 in real time. When the vehicle 120 travels to any road section, if it is detected that there is a dangerous travel scene such as an accident black spot and a track deviation, the on-board device 140 may generate a detection record of the dangerous travel scene. The detection record may be used for recording information such as the detected dangerous travel scene, a road section where the dangerous travel scene may be detected, and time at which the dangerous travel scene may be detected. The on-board device 140 may store the detection record locally, and the on-board device may also upload the detection record to the travel management device 110 for storage to enable sharing of the detection record of the dangerous travel scene with other transport means.

Figure 1B:
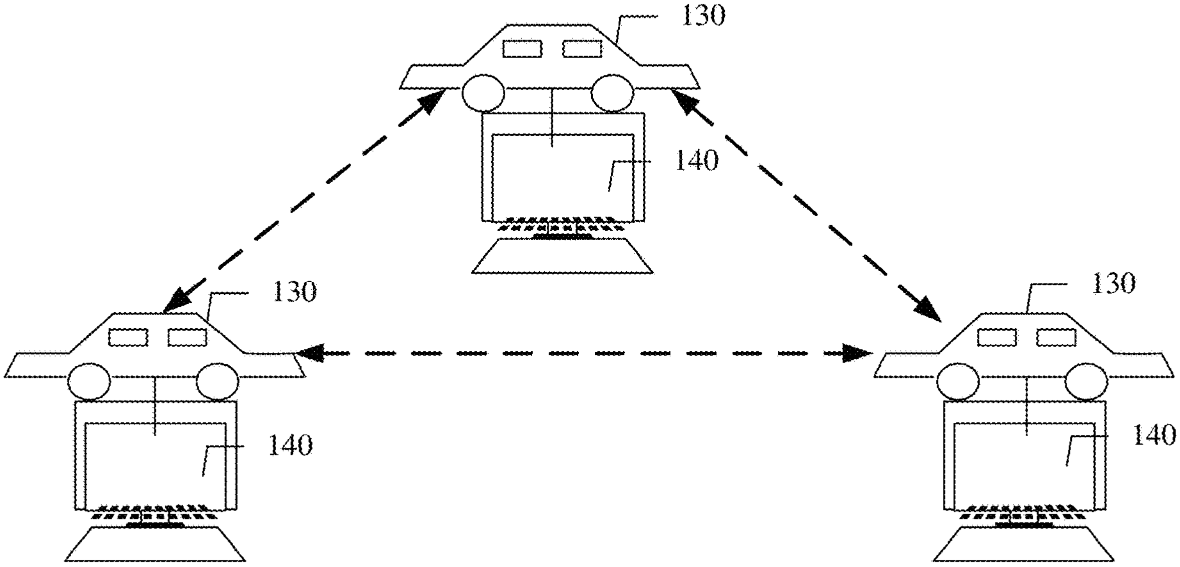
FIG. 1*b* is a schematic structural diagram of another information processing system according to an example of the present subject matter.

With the development of science and technology, the technology of vehicle-to-vehicle communication improves. If storage resources of an on-board device on a vehicle may be sufficient, the information processing system according to an example of the present subject matter may also be realized based on vehicle-to-vehicle communication. Referring to FIG. 1B, a schematic structural diagram of another information processing system according to an example of the present subject matter is shown. The information processing system may be implemented as a vehicle infrastructure cooperative system. The information processing system of FIG. 1B includes a plurality of vehicles 120 and on-board devices 140 corresponding to the vehicles. In FIG. 1B, the vehicles communicate with each other. In essence, the on-board devices 140 on the vehicles may communicate with each other.

In the information processing system shown in FIG. 1*b*, when the on-board device 140 on each vehicle detects a dangerous travel scene, a detection record may be generated and stored locally. Other vehicles may interact therewith to acquire a detection record of a dangerous travel scene on a certain road section.

In some examples, when a vehicle travels on a target road section, the target road section may be any one road section. If there may be a target dangerous travel scene that needs to be prompted, the on-board device 140 outputs prompt information indicating the existence of the target dangerous travel scene on the target road section.

In the related art, there may be a correlation between various dangerous travel scenes on a travel road. If only a target dangerous travel scene may be prompted, some other dangerous travel scenes having a large correlation with the target dangerous travel scene may be omitted, thereby reducing the safety of travel.

In order to solve this problem, in an example of the present subject matter, when the on-board device 140 detects that a target dangerous travel scene needs to be prompted, the on-board device 140 or the server 130 may acquire reference information corresponding to the target road section. The reference information may be determined according to a detection record corresponding to each of N dangerous travel scenes detected on the target road section within a target time period. These detection records may be acquired by the on-board device 140 or the server 130 from the travel management device 110, or may be acquired by the on-board device 140 interacting with other vehicles.

Further, an associated travel scene correlated to the target dangerous travel scene may be determined from the N dangerous travel scenes according to the reference information, and prompt information indicating the existence of the target dangerous travel scene and the associated travel scene may be output. Prompting more dangerous travel scenes may avoid more accidents, thereby improving the travel safety of vehicles.

In some examples, when the detection record may be acquired by the on-board device 140 from the travel management device 110 or may be acquired by interacting with other vehicles, the on-board device 140 determines an associated travel scene correlated to the target dangerous travel scene from the N dangerous travel scenes according to the reference information, and also outputs and displays prompt information indicating the existence of the target dangerous travel scene and the associated travel scene. Prompting more dangerous travel scenes may avoid more accidents, thereby improving the travel safety of vehicles.

In some examples, when the detection record may be acquired by the server 130 from the travel management device 110 or may be acquired by interacting with other vehicles, the server 130 may determine an associated travel scene correlated to the target dangerous travel scene from the N dangerous travel scenes according to the reference information, and also may output prompt information indicating the existence of the target dangerous travel scene and the associated travel scene to the on-board device 140, and the on-board device 140 may display the prompt information. Prompting more dangerous travel scenes may avoid more accidents, thereby improving the travel safety of vehicles.

Figure 2:
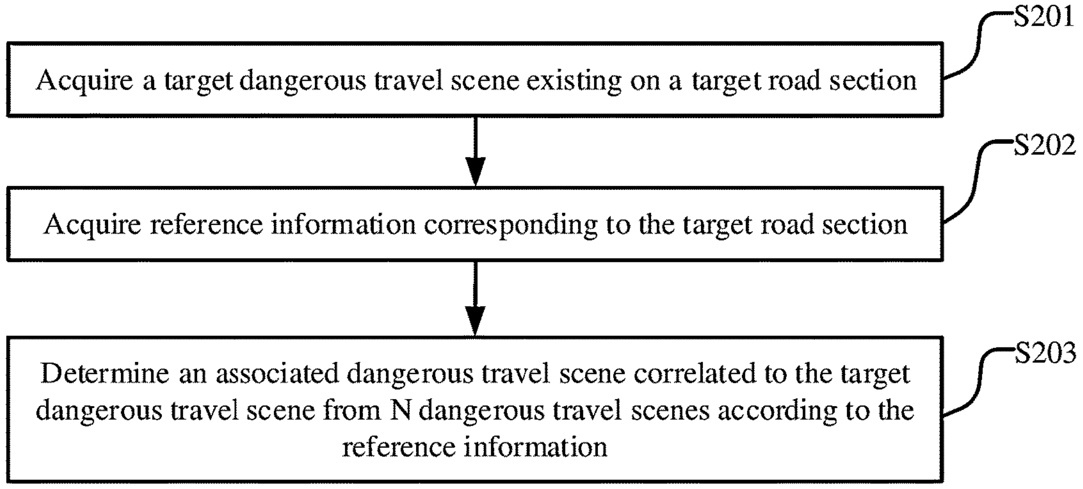
FIG. 2 is a schematic flowchart of an information processing method according to an example of the present subject matter.

Based on the schematic diagram of the above information processing system, an example of the present subject matter provides an information processing method. Referring to FIG. 2, a schematic flowchart of an information processing method according to an example of the present subject matter is shown. The information processing method shown in FIG. 2 may be performed by an information processing device, and may specifically be performed by a processor of the information processing device. The information processing device may be a device deployed in transport means, such as an on-board computer, or the information processing device may also be another device connected to the transport means. Alternatively, the information processing device may refer to a server. The information processing method shown in FIG. 2 may include the following steps: Step S201. Acquire a target dangerous travel scene existing on a target road section.

In some examples, the target road section may refer to any one road section on which the transport means may be traveling. The transport means may include a vehicle, a boat, an aircraft, and the like. The target dangerous travel scene may refer to any one of dangerous travel scenes that may exist during the travel of the transport means. The dangerous travel scene may refer to a travel scene where there may be a travel safety risk. For example, for the travel of the vehicle, the dangerous travel scene may include a track deviation, a forward collision, a low-speed collision, etc.

In some examples, the operation of acquiring a target dangerous travel scene existing on a target road section includes: when transport means travels on a target road section and if there may be a trigger event prompting a dangerous travel scene, acquiring a dangerous travel scene indicated by the trigger event as a target dangerous travel scene existing on the target road section.

In some examples, the existence of the trigger event prompting the dangerous travel scene may include receiving a prompt instruction of the dangerous travel scene transmitted by a travel management device of the transport means. At this moment, the target dangerous travel scene indicated by the trigger event may be a dangerous travel scene carried by the prompt instruction. That is, the trigger event may refer to a dangerous travel scene detected by the travel management device and existing on the target road section.

In other examples, the existence of the trigger event prompting the dangerous travel scene may include the existence of a trigger instruction for triggering the display of prompt information of the dangerous travel scene, and the trigger instruction may be a trigger operation on a touch control in the information processing device. For example, assuming that the information processing device displays a travel control interface while the vehicle may be traveling, the travel control interface may include a trigger control prompting a dangerous travel scene that may exist on the target road section, and when a user selects the trigger control, it may be determined that a trigger event may be detected.

In some examples, if the trigger event includes a trigger instruction for triggering the display of prompt information of the dangerous travel scene, the operation of acquiring a dangerous travel scene indicated by the trigger event as a target dangerous travel scene existing on the target road section includes: acquiring a detection record of each of N dangerous travel scenes detected on the target road section within the target time period; determining, according to the detection record of each dangerous travel scene, a count of each of the dangerous travel scenes being detected within the target time period; and determining a dangerous travel scene detected by a count greater than a count threshold as the dangerous travel scene indicated by the trigger event, and determining the dangerous travel scene indicated by the trigger event as the target dangerous travel scene. That is, one or more dangerous travel scenes appearing within a target time period by a count greater than a count threshold may be determined as the target dangerous travel scene indicated by the trigger event.

In conclusion, it may be seen that the number of target dangerous travel scenes may be at least one, and for the convenience of description, in the subsequent description of the examples of the present subject matter, any one target dangerous travel scene in at least one target dangerous travel scene may be introduced as an example. In other words, the target dangerous travel scene may be any one of the at least one target dangerous travel scene without special explanation.

Step S202. Acquire reference information corresponding to the target road section.

In some examples, the reference information may be determined according to a detection record corresponding to each of N dangerous travel scenes detected on the target road section within a target time period. N may be an integer greater than 1, and the detection record corresponding to each dangerous travel scene may be used for reflecting time at which the corresponding dangerous travel scene may be detected.

In some examples, the reference information includes a detection record corresponding to each of N dangerous travel scenes detected on the target road section within the target time period. For example, two detection records may be included in the reference information: The first detection record may be that a deviation of a travel track was detected at xx on Aug. 15, 2020, and the detection record may be that a forward collision was detected at xx on Aug. 16, 2020.

Step S203. Determine an associated dangerous travel scene correlated to the target dangerous travel scene from the N dangerous travel scenes according to the reference information.

In some examples, the associated dangerous travel scene correlated to the target dangerous travel scene may include a positively associated dangerous travel scene having a positive association with the target dangerous travel scene. The existence of the positive association between two dangerous travel scenes may refer to that any one of the dangerous travel scenes occurs and the other dangerous travel scene may also occur.

In some examples, it may be seen from the foregoing that the reference information may include a detection record corresponding to each of N dangerous travel scenes detected on the target road section within the target time period. Based on this, the operation of determining an associated dangerous travel scene according to the reference information in step S203 may include: determining, by the information processing device, a count of each of the dangerous travel scenes being detected within the target time period according to the detection record corresponding to each dangerous travel scene; and then, determining a positively associated dangerous travel scene correlated to the target dangerous travel scene from the N dangerous travel scenes according to the count of each of the dangerous travel scenes being detected within the target time period.

As a feasible implementation, the information processing device may divide the target time period into a plurality of sub-time periods. For example, if the target time period refers to the past 24 hours, the 24 hours may be divided into 24 sub-time periods, and each hour may be one sub-time period. Based on this, the operation of determining, according to the detection record corresponding to each dangerous travel scene, a count of each of the dangerous travel scenes being detected within the target time period includes: acquiring a count of each dangerous travel scene being detected within each sub-time period, and performing a summation operation on the count of being detected in each sub-time period, to obtain a count of each dangerous travel scene being detected within the target time period.

In some examples, the operation of determining a positively associated dangerous travel scene correlated to the target dangerous travel scene from the N dangerous travel scenes according to the count of each of the dangerous travel scenes being detected within the target time period includes: determining M dangerous travel scenes detected within the target time period by a count greater than a count threshold according to the count of each dangerous travel scene being detected within the target time period, M being greater than or equal to 1 and less than N; calculating an association value between each of the M dangerous travel scenes and the target dangerous travel scene; and selecting a dangerous travel scene having the association value greater than the association value threshold as a positively associated dangerous travel scene correlated to the target dangerous travel scene.

Since the purpose of prompting a dangerous travel scene may be to improve travel safety and reduce the traffic accident rate, if the association between two dangerous travel scenes may be so large that the association value therebetween may be greater than a non-traffic accident rate, it may not possible to miss one of the two dangerous travel scenes when prompting the other one, otherwise, it may be likely to improve the traffic accident rate by prompting only one of the dangerous travel scenes. Alternatively, from another perspective, if the association value between the two dangerous travel scenes may be already greater than the non-traffic accident rate, the two dangerous travel scenes cannot be missed, otherwise, it may not advantageous to reduce the traffic accident rate. Based on the above description, the association value threshold may be determined according to the traffic accident rate on the target road section. For example, the traffic accident rate on the target road section may be represented as $p_{traffic}$, and the association value threshold may be represented as $1-p_{traffic}$.

The operation of calculating an association value between each of the M dangerous travel scenes and the target dangerous travel scene includes: inputting a count of each of the M dangerous travel scenes being detected within the target time period and a count of the target dangerous travel scene being detected within the target time period into an association calculation formula for operation, the operation result being the association between the target dangerous travel scene and each dangerous travel scene.

It may be assumed that $t_j$ represents a count of a target dangerous travel scene being detected within a $j^{th}$ sub-time period, it may be assumed that $x_{i,j}$ represents a count of a dangerous travel scene i in M dangerous travel scenes being detected within the $j^{th}$ sub-time period, and it may be assumed that the target time period may be divided into m sub-time periods. Then, the above association calculation formula may be represented as shown in Formula (1):

$$C_{i,j} = \frac{\sum_{k=1}^{m}\left(\left(x_{i,k} - \frac{1}{m}\sum_{k=1}^{m} x_{i,k}\right)\left(x_{j,k} - \frac{1}{m}\sum_{k=1}^{m} x_{j,k}\right)\right)}{\sqrt{\sum_{k=1}^{m}\left(x_{i,k} - \frac{1}{m}\sum_{k=1}^{m} x_{i,k}\right)^2}\sqrt{\sum_{k=1}^{m}\left(x_{j,k} - \frac{1}{m}\sum_{k=1}^{m} x_{j,k}\right)^2}} \quad (1)$$

In Formula (1), $C_{t,i}$ represents an association value between the target dangerous travel scene and the dangerous travel scene i, m represents that the target time period may be divided into m sub-time periods, and k represents a $k^{th}$ sub-time period.

In other examples, the operation of determining an associated dangerous travel scene correlated to the target dangerous travel scene according to the reference information in step S203 may further include:

calculating, according to the count of each of the N dangerous travel scenes being detected and the count of the target dangerous travel scene being detected, an association value between any one dangerous travel scene and the target dangerous travel scene, to obtain a first-type association value set; and calculating an association value between any two of the N dangerous travel scenes, to obtain a second-type association value set; selecting a dangerous travel scene corresponding to an association value greater than the association value threshold in the first-type association value set, and adding the dangerous travel scene to a first associated scene subset; recursively searching for each dangerous travel scene in the first associated scene subset, to select a dangerous travel scene having an association value, with each dangerous travel scene, greater than the association value threshold from the second-type association value set and to add the dangerous travel scene to a second associated scene subset of the corresponding dangerous travel scene; and performing a union taking operation on the first associated scene subset and each second associated scene subset, and taking a union taking operation result as a positively associated dangerous travel scene correlated to the target dangerous travel scene.

In brief, a candidate dangerous travel scene having an association value, with the target dangerous travel scene, greater than the association value threshold may be first searched in N dangerous travel scenes. Then, a dangerous travel scene having an association value, with the candidate dangerous travel scene, greater than the association value threshold may be continuously searched in remaining dangerous travel scenes in the N dangerous travel scenes. Recursive search may be performed in sequence. Finally, union taking processing may be performed on all the found dangerous travel scenes, and the obtained result may be used as a positively associated dangerous travel scene.

In other examples, the associated dangerous travel scene correlated to the target dangerous travel scene may include a negatively associated dangerous travel scene having a positive association with the target dangerous travel scene. The existence of the negative association between two dangerous travel scenes may refer to that any one of the dangerous travel scenes occurs and the other dangerous travel scene may not occur.

Based on this, when determining an associated dangerous travel scene correlated to the target dangerous travel scene, in addition to the above determination of a positively associated dangerous travel scene, the determination of a negatively associated dangerous travel scene may also be included. In a specific implementation, an association value between each dangerous travel scene and the target dangerous travel scene may be calculated according to the count of each of the N dangerous travel scenes being detected and the count of the target dangerous travel scene being detected within the target time period. A dangerous travel scene corresponding to an association value that may be less than 0 and has an absolute value greater than the association value threshold may be determined as a negatively associated dangerous travel scene negatively correlated to the target dangerous travel scene.

In some examples, after determining an associated dangerous travel scene correlated to the target dangerous travel scene, the information processing device may also perform the following operations: outputting dangerous travel prompt information according to the target dangerous travel scene and the associated dangerous travel scene, the dangerous travel prompt information including any one or more of the target dangerous travel scene and the associated dangerous travel scene.

In some examples, assuming that the information processing device may be an on-board device, an implementation of outputting dangerous travel prompt information according to the target dangerous travel scene and the associated dangerous travel scene may be: if the size of a display screen of the information processing device may be large enough, the target dangerous travel scene and the associated dangerous travel scene may both be carried in the dangerous travel prompt information to prompt a driver of a possible travel risk on a current road; and if the size of a display screen of the information processing device may be small, it may be possible to carry only the target dangerous travel scene in the dangerous travel prompt information for prompt.

In some examples, the form of the dangerous travel prompt information may include any one or a combination of the following: text display prompt, voice playing prompt, etc. The dangerous travel prompt information may be displayed in a travel control interface of the information processing device. The travel control interface may be displayed when a travel control button of the information processing device may be triggered. Specifically, a user interface of the information processing device may include a travel control. When the travel control may be triggered, the information processing device may display a travel control interface. The travel control interface may be configured to display a real-time travel picture of a vehicle.

When it may be detected that a dangerous travel scene needs to be prompted, the information processing device may display dangerous travel prompt information in the travel control interface. It may be assumed that a target dangerous travel scene existing on a target road section may be A, a positively associated dangerous travel scene associated with the target dangerous travel scene may be dangerous travel scene B, and a negatively associated dangerous travel scene associated with the target dangerous travel scene may be dangerous travel scene C. Based on this, the dangerous travel prompt information may be in any one or more of the following forms: "Dangerous travel scene A and dangerous travel scene B exist on the current road section", "dangerous travel scene A exists on the current road section", "dangerous travel scene B exists on the current road section", "dangerous travel scene C does not exist on the current road section", and "dangerous travel scenes A and B exist on the current road section, and dangerous travel scene C does not exist".

Figure 3:
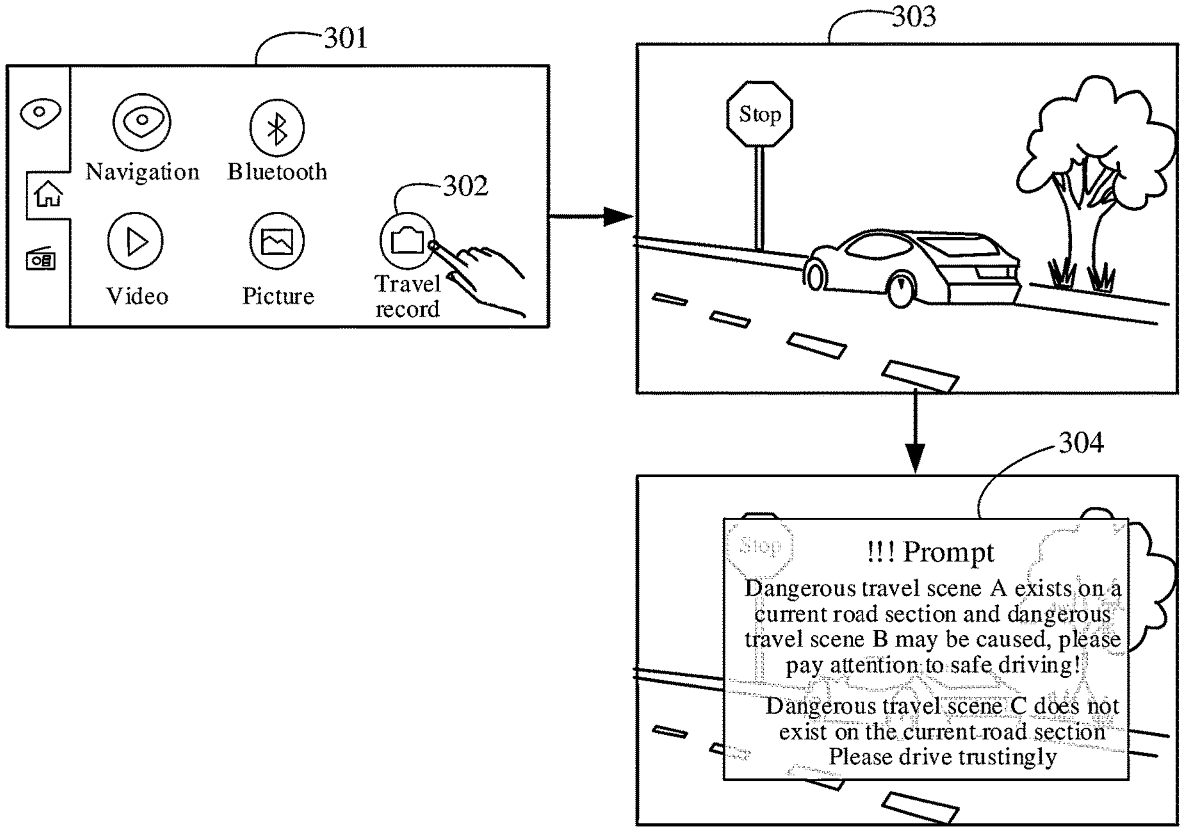
FIG. 3 is a schematic diagram of a travel control interface according to an example of the present subject matter.

For example, referring to FIG. 3, a schematic diagram of an information processing device displaying dangerous travel scene prompt information according to an example of the present subject matter is shown. In FIG. 3, it may be assumed that 301 represents a user interface in an information processing device and a travel control 302 may be included in the user interface 301. The information processing device displays a travel control interface as shown at 303 in FIG. 3 when 302 may be triggered. In 303, a vehicle travel picture may be displayed in real time. When the information processing device detects that the vehicle has traveled to the current section and a dangerous travel scene needs to be prompted, dangerous travel prompt information may be popped up in the travel control interface, as shown at 304.

The above may be only one form of possible dangerous travel prompt information listed in the examples of the present subject matter. In a specific application, the dangerous travel prompt information may also be "there may be a dangerous travel scene in the current road section, and click to view details". At this moment, when a control "click to view details" may be triggered, one or more dangerous travel scenes carried in the dangerous travel prompt information may be displayed.

In an example of the present subject matter, when transport means travels on a target road section, a target dangerous travel scene existing on the target road section may be acquired. Further, reference information corresponding to the target road section may be acquired, and an associated dangerous travel scene correlated to the target dangerous travel scene may be determined from N dangerous travel scenes according to the reference information. In the above process, the information processing device may acquire an associated dangerous travel scene correlated to a target dangerous travel scene according to acquired reference information, so that when a dangerous travel prompt may be required, the information processing device may not only prompt the existence of the target dangerous travel scene, but also prompt the associated dangerous travel scene associated with the target dangerous travel scene. Prompting more dangerous travel scenes may avoid more accidents, and may improve the travel safety of transport means.

Figure 4:
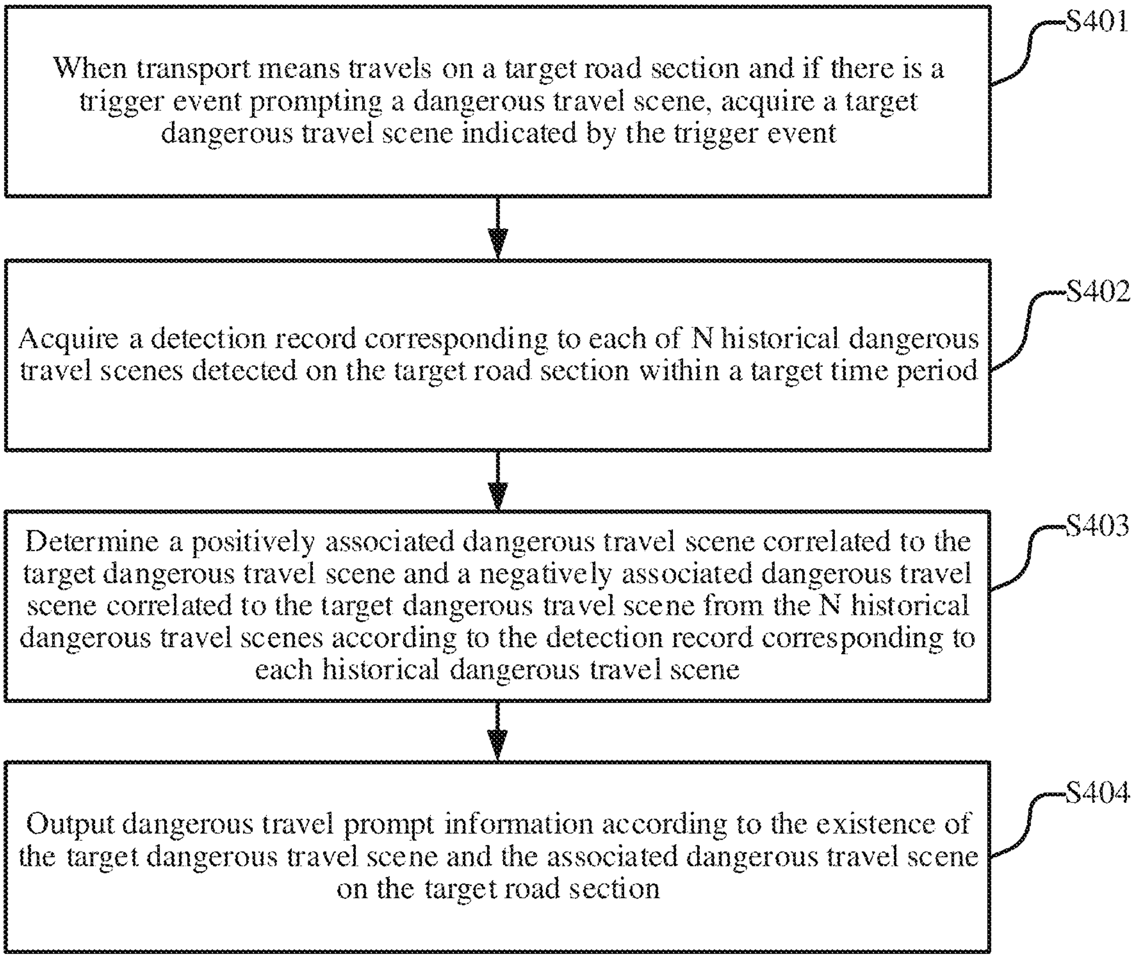
FIG. 4 is a schematic flowchart of another information processing method according to an example of the present subject matter.

Based on the schematic diagram of the above information processing system, an example of the present subject matter provides an information processing method. Referring to FIG. 4, a schematic flowchart of an information processing method according to an example of the present subject matter is shown. The information processing method shown in FIG. 4 may be performed by an information processing device, and may specifically be performed by a processor of the information processing device. The information processing device may be any device deployed in transport means, such as an on-board computer deployed in a vehicle, or the information processing device may also be another device connected to the transport means. Reference information corresponding to a target road section in the information processing method shown in FIG. 4 may include a detection record corresponding to each of N dangerous travel scenes detected on the target road section within a target time period. The information processing method shown in FIG. 4 may include the following steps: Step S401. When transport means travels on a target road section and if there may be a trigger event prompting a dangerous travel scene, acquire a target dangerous travel scene indicated by the trigger event. Step S402. Acquire a detection record corresponding to each of N dangerous travel scenes detected on the target road section within a target time period. Step S403. Determine a positively associated dangerous travel scene correlated to the target dangerous travel scene and a negatively associated dangerous travel scene correlated to the target dangerous travel scene from the N dangerous travel scenes according to the detection record corresponding to each dangerous travel scene.

In some examples, the information processing device may determine a count of each of the N dangerous travel scenes appearing within the target time period according to the detection record corresponding to each dangerous travel scene, then determine an association between any one dangerous travel scene and the target dangerous travel scene and an association between any two dangerous travel scenes according to the count of each dangerous travel scene appearing, and further determine an associated dangerous travel scene correlated to the target dangerous travel scene according to the calculated associations. The associated dangerous travel scene includes a positively associated dangerous travel scene and a negatively associated dangerous travel scene.

In a specific implementation, the operation of determining an associated dangerous travel scene correlated to the target dangerous travel scene from the N dangerous travel scenes according to the reference information includes S1-S4: S41. Determine, according to the detection record corresponding to each dangerous travel scene, a count of each dangerous travel scene being detected within the target time period, and a count of the target dangerous travel scene being detected within the target time period. S42. Determine an association value between the target dangerous travel scene and each dangerous travel scene based on the count of the target dangerous travel scene being detected and the count of each dangerous travel scene being detected, to obtain a first-type association value set. S43. Determine, according to a count of any two of the N dangerous travel scenes being detected, an association value between any two dangerous travel scenes, to obtain a second-type association value set. S44. Determine an associated dangerous travel scene correlated to the target dangerous travel scene from the N dangerous travel scenes according to at least one of the first-type association value set and the second-type association value set.

In some examples, the target dangerous travel scene in S41 may refer to a dangerous travel scene that first appears within the target time period. At this moment, a count of the target dangerous travel scene being detected within the target time period may be 1. In other examples, the target dangerous travel scene may also refer to a dangerous travel scene which has appeared within the target time period. The target dangerous travel scene may refer to any one of the N dangerous travel scenes. At this moment, the determination of a count of the target dangerous travel scene being detected within the target time period substantially refers to determining a count of any one of the above target dangerous travel scenes being detected within the target time period.

The information processing device may divide the target time period into a plurality of sub-time periods. For example, if the target time period refers to the past 24 hours, the 24 hours may be divided into 24 sub-time periods, and each hour may be one sub-time period. The operation of determining a count of each dangerous travel scene being detected within the target time period according to the detection record corresponding to each dangerous travel scene in step S41 includes: acquiring a count of each dangerous travel scene being detected within each sub-time period. Similarly, a count of the target dangerous travel scene being detected within the target time period also refers to a count of the target dangerous travel scene being detected within each sub-time period.

Figure 5A:
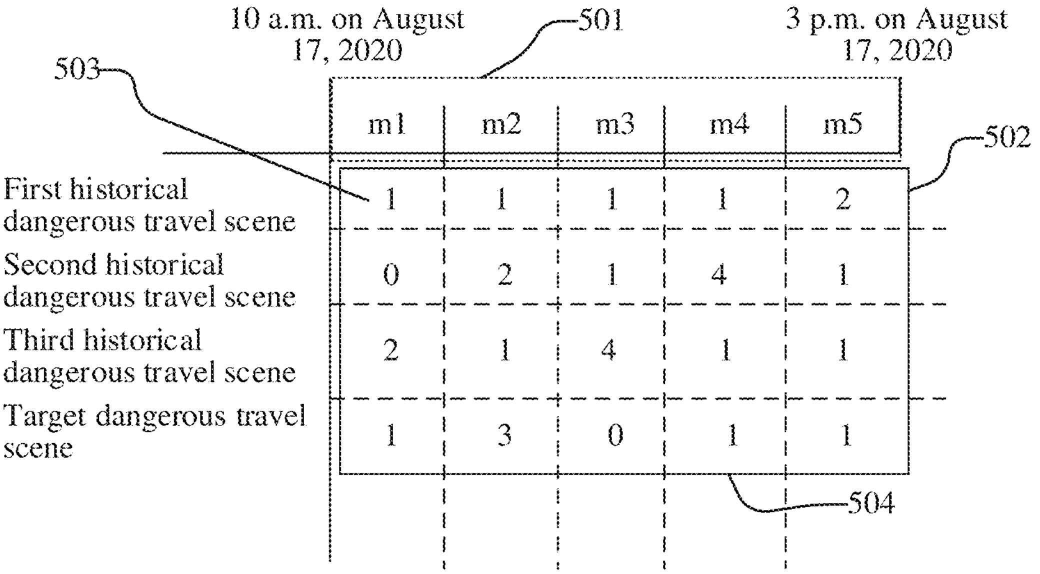
FIG. 5*a* is a schematic diagram of determining a count of a dangerous travel scene being detected within a target time period according to an example of the present subject matter.

For example, referring to FIG. 5*a*, a schematic diagram of determining a count of a dangerous travel scene being detected within a target time period according to an example of the present subject matter is shown. 501 represents a target time period. It may be assumed that each hour may be divided into a sub-time period from 10 a.m. on Aug. 17, 2020 to 3 p.m. on Aug. 17, 2020. 501 includes five sub-time periods, respectively represented as m1, m2, m3, m4, and m5. It may be assumed that N may be 3, that is, three dangerous travel scenes may be included, respectively represented as a first dangerous travel scene, a second dangerous travel scene, and a third dangerous travel scene. The target dangerous travel scene may not included in the N dangerous travel scenes. Then, a count of each dangerous travel scene being detected within each sub-time period may be as shown at 502 in FIG. 5*a*. 503 in 502 represents a count of the first dangerous travel scene being detected within the first sub-time period, and 504 represents a count of the target dangerous travel scene being detected within the $3^{rd}$ sub-time period.

After determining the count of each dangerous travel scene being detected within the target time period and the count of the target dangerous travel scene being detected within the target time period in S41, an association value between the target dangerous travel scene and each dangerous travel scene may be calculated in step S42, and a plurality of association values constitute a first-type association value set. It may be seen from the foregoing that the number of target dangerous travel scenes may be at least one. In an example of the present subject matter, taking any one target dangerous travel scene as an example, how to determine an associated dangerous travel scene for any one of the target dangerous travel scenes may be specifically introduced. In some examples, it may be assumed that $t_j$ represents a count of a target dangerous travel scene being detected within a $j^{th}$ sub-time period, it may be assumed that $x_{i,j}$ represents a count of a dangerous travel scene i being detected within the $j^{th}$ sub-time period, and it may be assumed that the target time period may be divided into m sub-time periods. Then, an association value between the target dangerous travel scene and the dangerous travel scene i within the target time period may be represented by the following formula (2). The dangerous travel scene i may be any one dangerous travel scene.

$$C_{t,i} = \frac{\sum_{k=1}^{m}\left(\left(t_k - \frac{1}{m}\sum_{k=1}^{m} t_k\right)\left(x_{i,k} - \frac{1}{m}\sum_{k=1}^{m} x_{i,k}\right)\right)}{\sqrt{\sum_{k=1}^{m}\left(t_k - \frac{1}{m}\sum_{k=1}^{m} t_k\right)^2}\sqrt{\sum_{k=1}^{m}\left(x_{i,k} - \frac{1}{m}\sum_{k=1}^{m} x_{i,k}\right)^2}} \quad (2)$$

In Formula (2), $C_{t,i}$ represents an association value between the target dangerous travel scene and the dangerous travel scene i, m represents that the target time period may be divided into m sub-time periods, and k represents a $k^{th}$ sub-time period. Using Formula (2), an association value between the target dangerous travel scene and each dangerous travel scene may be calculated, to obtain N association values. The N association values constitute a first-type association value set.

Further, in step S43, an association value between any two dangerous travel scenes may be determined according to a count of any two of the N dangerous travel scenes being detected within the target time period, to obtain a second-type association value set. In a specific implementation, assuming that the target time period may be divided into m sub-time periods, an association value between a dangerous travel scene i and a dangerous travel scene j may be calculated by Formula (3). The dangerous travel scene i and the dangerous travel scene j may be any two different dangerous travel scenes in N dangerous travel scenes:

$$C_{i,j} = \frac{\sum_{k=1}^{m}\left(\left(x_{i,k} - \frac{1}{m}\sum_{k=1}^{m} x_{i,k}\right)\left(x_{j,k} - \frac{1}{m}\sum_{k=1}^{m} x_{j,k}\right)\right)}{\sqrt{\sum_{k=1}^{m}\left(x_{i,k} - \frac{1}{m}\sum_{k=1}^{m} x_{i,k}\right)^2}\sqrt{\sum_{k=1}^{m}\left(x_{j,k} - \frac{1}{m}\sum_{k=1}^{m} x_{j,k}\right)^2}} \quad (3)$$

In Formula (3), $C_{i,j}$ represents an association between the dangerous travel scene i and a dangerous travel scene j, $x_{i,k}$ represents a count of the dangerous travel scene i being detected within a $k^{th}$ sub-time period, and $x_{j,k}$ represents a count of the dangerous travel scene j being detected within the $k^{th}$ sub-time period.

In some examples, if the target dangerous travel scene may be any one of N dangerous travel scenes, in order to avoid repeated calculation, the target dangerous travel scene may be removed from the N dangerous travel scenes to obtain remaining dangerous travel scenes, and then an association value between each dangerous travel scene in the remaining dangerous travel scenes and the target dangerous travel scene may be calculated. And an association value between any two dangerous travel scenes in the remaining dangerous travel scenes may be calculated.

In other examples, if the target dangerous travel scene may be any one of N dangerous travel scenes, an association value between the target dangerous travel scene and any one dangerous travel scene may be directly calculated without removing the target dangerous travel scene from the N dangerous travel scenes (the target dangerous travel scene may be included in any one dangerous travel scene, and the association value between two target dangerous travel scenes may be greater than the association value between any other dangerous travel scene and the target dangerous travel scene).

In some examples, after determining the first-type association value set and the second-type association value set in step S42 and step S43, an associated dangerous travel scene correlated to the target dangerous travel scene may be determined from the N dangerous travel scenes according to at least one of the first-type association value set and the second-type association value set in step S43.

It may be seen from the foregoing that the associated dangerous travel scene correlated to the target dangerous travel scene may include a positively associated dangerous travel scene and a negatively associated dangerous travel scene. The positively associated dangerous travel scene refers to a dangerous travel scene having an existence probability greater than a certain threshold if the target dangerous travel scene exists. If the target dangerous travel scene exists, the probability that the corresponding positively associated dangerous travel scene also exists may be greater. The negatively associated dangerous travel scene refers to a dangerous travel scene having an existence probability less than a certain threshold if the target dangerous travel scene exists. If the target dangerous travel scene exists, the probability that the corresponding negatively associated dangerous travel scene also exists may be very small, or even zero.

In some examples, if the associated dangerous travel scene includes a positively associated dangerous travel scene, the operation of determining an associated dangerous travel scene correlated to the target dangerous travel scene from the N dangerous travel scenes according to at least one of the first-type association value set and the second-type association value set in step S43 includes:

adding a dangerous travel scene involved in an association value greater than the association value threshold in the first-type association value set to a first associated scene subset; recursively analyzing each dangerous travel scene in the first associated scene subset based on the second-type association value set, and determining a second associated scene subset corresponding to each dangerous travel scene in the first associated scene subset from the N dangerous travel scenes; and performing a union taking operation on the first associated scene subset and the second associated scene subset corresponding to each dangerous travel scene in the first associated scene subset, and determining a positively associated dangerous travel scene correlated to the target dangerous travel scene from a union taking operation result.

In some examples, the association value threshold may be determined according to the traffic accident rate on the target road section. For example, the traffic accident rate on the target road section may be represented as $p_{traffic}$, and the association value threshold may be represented as $1-p_{traffic}$. In other examples, the association value threshold may also be determined empirically.

In some examples, it may be assumed that the first associated scene subset includes a first dangerous travel scene and the N dangerous travel scenes include a second dangerous travel scene. Taking the first dangerous travel scene and the second dangerous travel scene as an example, how to recursively analyze each dangerous travel scene in the first associated scene subset based on the second-type association value and determine a second associated scene subset corresponding to each dangerous travel scene in the first associated scene subset from the N dangerous travel scenes may be described below. In a specific implementation, an association value between the first dangerous travel scene and the second dangerous travel scene may be determined from the second-type association value. The second dangerous travel scene may be added to a second associated scene subset corresponding to the first dangerous travel scene if the association value between the first dangerous travel scene and the second dangerous travel scene may be greater than or equal to the association value threshold.

In brief, for a first dangerous travel scene in a first associated scene subset, a second dangerous travel scene having an association value, with the first dangerous travel scene, greater than an association value threshold may be added to a second associated scene subset corresponding to the first dangerous travel scene. However, in this manner, the following situations may exist: The second dangerous travel scene conflicts with the target dangerous travel scene. The second dangerous travel scene does not appear if the target dangerous travel scene appears.

In order to avoid the above problem, a second associated scene subset corresponding to the first dangerous travel scene may be determined according to the following steps: determining an association value between the first dangerous travel scene and the second dangerous travel scene from the second-type association value; and adding the second dangerous travel scene to a second associated scene subset corresponding to the first dangerous travel scene when the association value between the first dangerous travel scene and the second dangerous travel scene may be greater than or equal to the association value threshold and an association value between the second dangerous travel scene and the target dangerous travel scene in the first-type association value set satisfies an association condition. In this way, it may be ensured that no dangerous travel scene that conflicts with the target dangerous travel scene exists in the second associated scene subset corresponding to the first dangerous travel scene.

The association value between the second dangerous travel scene and the target dangerous travel scene satisfying the association condition may include any one or more of the following situations: The association value between the second dangerous travel scene and the target dangerous travel scene may be greater than 0 and greater than a specified threshold. The specified threshold may be equal to the association value threshold, or the specified threshold may be another value not equal to the association value threshold. The association value between the second dangerous travel scene and the target dangerous travel scene may be less than 0 and has an absolute value less than the specified threshold.

Figure 5B:
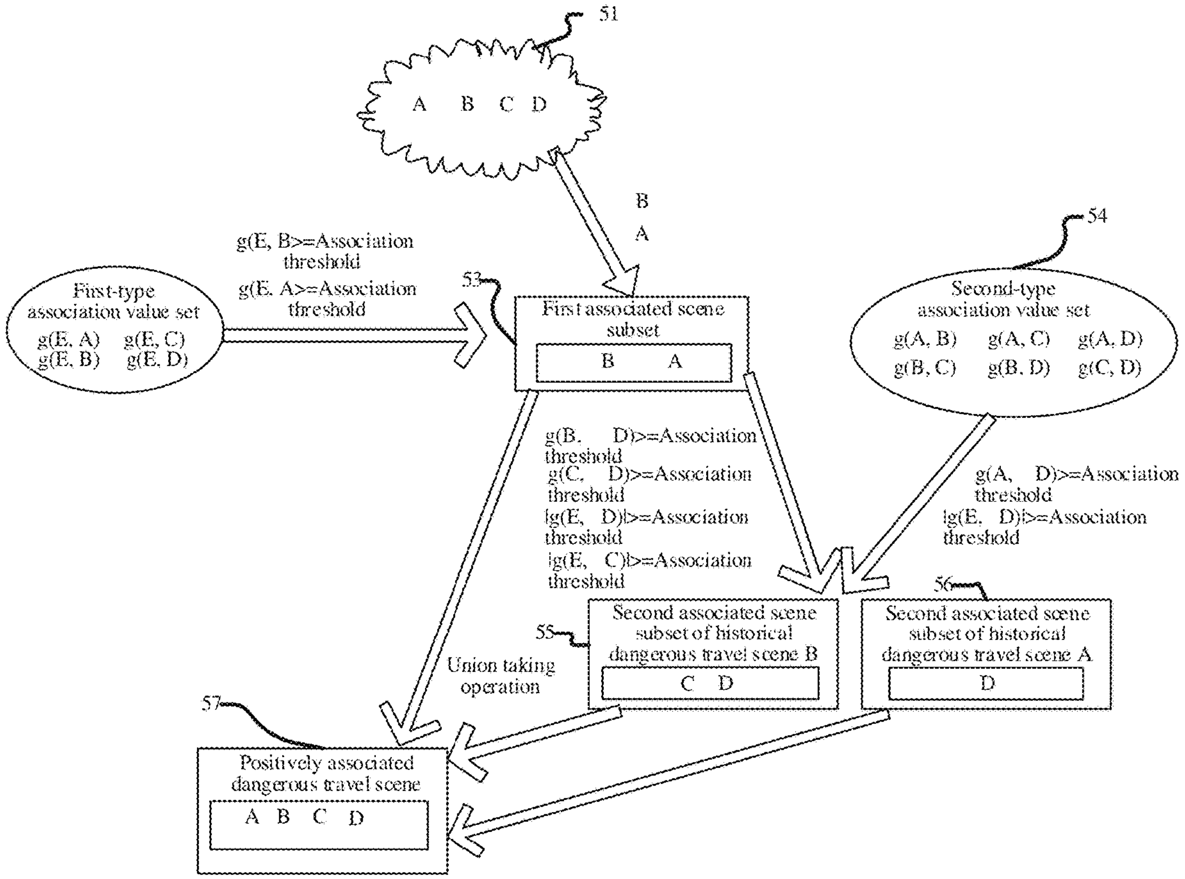
FIG. 5*b* is a schematic diagram of a positively associated dangerous travel scene correlated to a target dangerous travel scene according to an example of the present subject matter.

For example, referring to FIG. 5*b*, a schematic diagram of a positively associated dangerous travel scene correlated to a target dangerous travel scene according to an example of the present subject matter is shown. 51 represents N dangerous travel scenes, it may be assumed that dangerous travel scenes included in the N dangerous travel scenes may be represented as A, B, C, and D, and a target dangerous travel scene E may not included in the N dangerous travel scenes. 52 represents a first-type association value set, and the first-type association value set includes association values between the target dangerous travel scene E and various dangerous travel scenes, represented as g(E, A), g(E, B), g(E, C), and g(E, D). Assuming that the association value g(E, A) between A and the target dangerous travel scene E may be greater than an association value threshold and the association value g(E, B) between B and the target dangerous travel scene E may be greater than the association value threshold in first-type association values, A and B in the N dangerous travel scenes constitute a first associated scene subset, represented as 53.

Further, it may be assumed that a second-type association value set may be represented as 54, and the second-type association value set includes association values between various dangerous travel scenes, specifically represented as g(A, B), g(A, C), g(A, D), g(B, C), g(B, D), and g(C, D). For B in the first associated scene subset, if it may be found based on the second-type association value set that the association values g(B, D) and g(B, C) between B and D and between B and C may be greater than the association value threshold and an association between C and the target dangerous travel scene E and an association between D and the target dangerous travel scene E may be both greater than the association value threshold, C and D may be taken as a second associated scene subset of B, represented as 55. And it may be found based on the second-type association value set that the association value g(B, D) between B and D may be greater than the association value threshold, D may be taken as a second associated scene subset of A, represented as 56. Next, union taking processing may be performed on the second associated scene subset 55 and the second associated scene subset 56 to obtain A, B, C, and D, and these dangerous travel scenes may be taken as positively associated dangerous travel scenes of the target travel scene as shown in 57.

In other examples, if the associated dangerous travel scene correlated to the target dangerous travel scene includes a negatively associated dangerous travel scene, the operation of determining an associated dangerous travel scene correlated to the target dangerous travel scene from the N dangerous travel scenes according to at least one of the first-type association value set and the second-type association value set in step S44 includes: determining a dangerous travel scene involved in an association value less than a second association value threshold in the first-type association value set as a negatively associated dangerous travel scene correlated to the target dangerous travel scene.

Step S404. Output dangerous travel prompt information according to the existence of the target dangerous travel scene and the associated dangerous travel scene on the target road section.

In an example of the present subject matter, when transport means travels on a target road section and if there may be a trigger event prompting a dangerous travel scene, a target dangerous travel scene indicated by the trigger event may be acquired. Further, a detection record corresponding to each of N dangerous travel scenes detected on the target road section within the target time period may be acquired. Further, a positively associated dangerous travel scene correlated to the target dangerous travel scene and a negatively associated dangerous travel scene correlated to the target dangerous travel scene may be determined from the N dangerous travel scenes according to the detection record corresponding to each dangerous travel scene. Then, prompt information indicating the existence of the target dangerous travel scene and the positively associated dangerous travel scene on the target road section and absence of the negatively associated dangerous travel scene may be output. In the above process, the information processing device may not only prompt the existence of the target dangerous travel scene, but also prompt the positively associated dangerous travel scene associated with the target dangerous travel scene, thereby improving the situation of the missed alarm. Also, the information processing device may also give prompt information indicating the absence of the negatively associated dangerous travel scene correlated to the target dangerous travel scene, to improve the convenience of travel.

Figure 6:
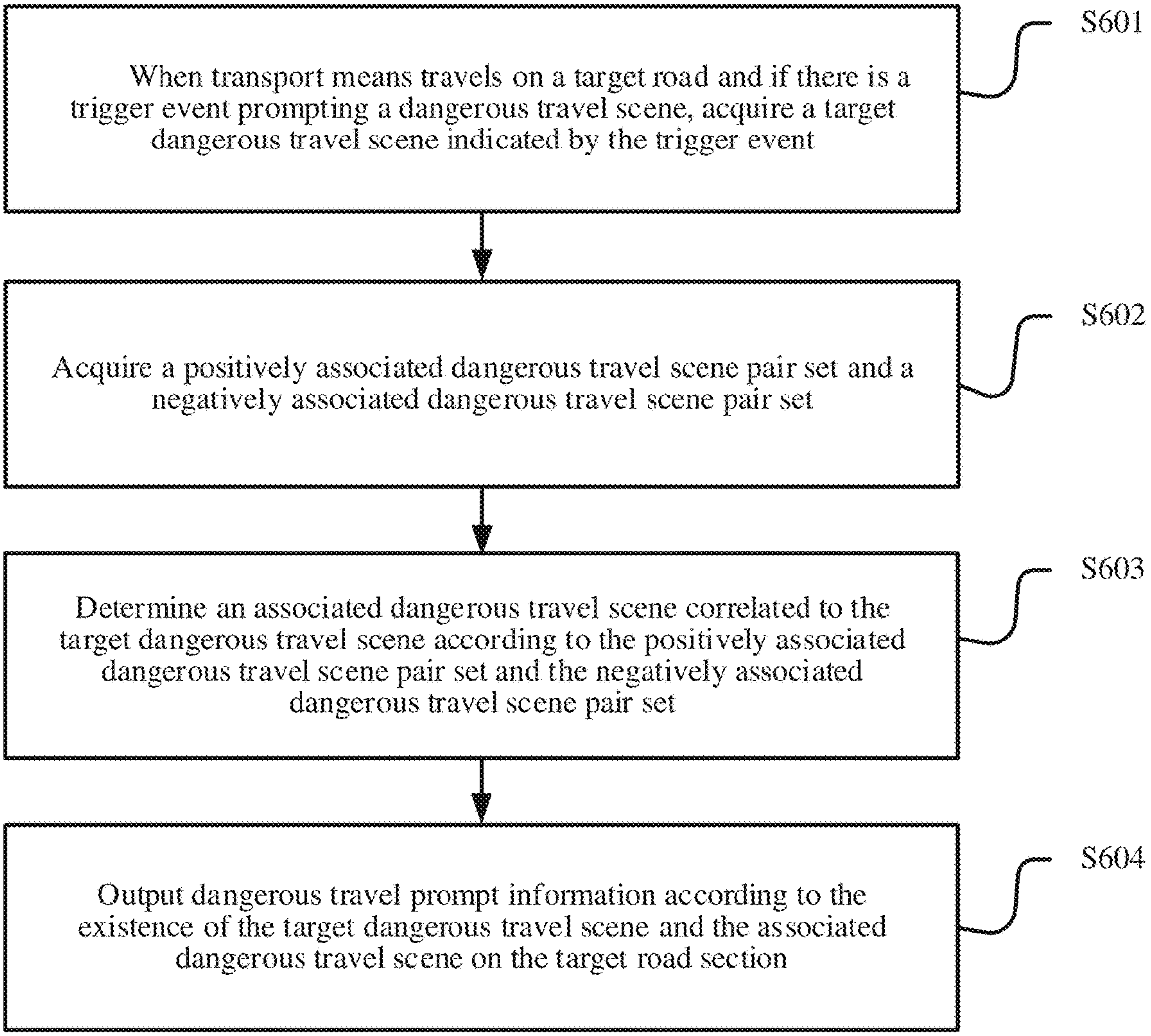
FIG. 6 is a schematic flowchart of yet another information processing method according to an example of the present subject matter.

Based on the above information processing method, an example of the present subject matter provides another information processing method. Referring to FIG. 6, a schematic flowchart of another information processing method according to an example of the present subject matter is shown. The information processing method shown in FIG. 6 may be performed by an information processing device, and may specifically be performed by a processor of the information processing device. Reference information in the information processing method shown in FIG. 6 may include a positively associated dangerous travel scene pair set and a negatively associated dangerous travel scene pair set. The information processing method shown in FIG. 6 may include the following steps: Step S601. When transport means travels on a target road section and if there may be a trigger event prompting a dangerous travel scene, acquire a target dangerous travel scene indicated by the trigger event.

In some examples, some feasible implementations included in step S601 may be described with reference to step S201 in the example of FIG. 2 and will not be described in detail herein.

Step S602. Acquire a positively associated dangerous travel scene pair set and a negatively associated dangerous travel scene pair set.

In some examples, each positively associated dangerous travel scene pair in the positively associated dangerous travel scene pair set corresponds to an association value, and each negatively associated dangerous travel scene pair in the negatively associated dangerous travel scene pair set corresponds to an association value. The association value corresponding to any one dangerous travel scene pair may be determined based on detection records corresponding to two dangerous travel scenes included in any one dangerous travel scene pair. The association value between two dangerous travel scenes included in each positively associated dangerous travel scene pair may be greater than or equal to the association value threshold. And, two dangerous travel scenes included in one positively associated dangerous travel scene pair may be allowed to exist simultaneously, and a probability that the two dangerous travel scenes included in the positively associated dangerous travel scene pair exist simultaneously may be positively correlated to a corresponding first association value.

An absolute value of the association value between two dangerous travel scenes included in each negatively associated dangerous travel scene pair may be greater than or equal to the association value threshold, and two dangerous travel scenes included in one negatively associated dangerous travel scene pair may be not allowed to exist simultaneously.

In some examples, the step of determining a positively associated dangerous travel scene pair and a negatively associated dangerous travel scene pair according to the detection record corresponding to each of the N dangerous travel scenes may be performed before the detection of the trigger event or may be performed after the detection of the trigger event. The step may be performed before the trigger event may be detected, so that the efficiency of the information processing device outputting prompt information may be improved. How to determine a positively associated dangerous travel scene pair and a negatively associated dangerous travel scene pair according to the detection record corresponding to each of the N dangerous travel scenes may be specifically introduced as follows:

① After the information processing device acquires the detection record of each of the N dangerous travel scenes within the target time period on the target road section, the information processing device divides the target time period into m sub-time periods, and acquires a count of each dangerous travel scene being detected within each sub-time period according to the detection record corresponding to each dangerous travel scene. As shown in FIG. 5*a*, $x_{i,k}$ represents a count of the dangerous travel scene i being detected within a $k^{th}$ sub-time period.

② The information processing device determines an association value between every two dangerous travel scenes according to a count of each dangerous travel scene being detected within each sub-time period. In a specific implementation, the information processing device may determine the association value between any two dangerous travel scenes by the above Formula (3). It may be assumed that the association value between any two of the N dangerous travel scenes determined according to Formula (3) may be represented as $c_{1,2}$, $c_{1,n}$ . . . $c_{1,n}$, $c_{2,3}$, $c_{2,4}$, . . . $c_{2,n}$ . . . $c_{n-1,n}$. The total number of the finally determined association values may be n(n−1)/2. The association values may be symmetrical, i.e. $c_{i,j}=c_{j,i}$, where n represents the number of N dangerous travel scenes.

③ The information processing device divides each of the association values into two parts according to the association value between any two dangerous travel scenes. One part may be first candidate association values greater than 0, and the other part may be second candidate association values less than 0. It may be assumed that the first candidate association values selected from the above plurality of association values may be represented as $c_{pos,1}$, $c_{pos,2}$, . . . $c_{pos,x}$. The second candidate association values selected from the above plurality of association values may be represented as: $c_{neg,1}$, $c_{neg,2}$, . . . $c_{neg,y}$. And x+y=n(n−1)/2.

④ For the first candidate association values, the information processing device selects an association value greater than or equal to an association value threshold from the first candidate association values. It may be seen from the foregoing that the association value threshold may be determined according to a non-traffic accident rate on the target road section. Assuming that $p_{traffic}$ represents a traffic accident rate on the target road section, the data information processing device may obtain from a traffic management department or a road maintenance side, and the non-traffic accident rate may be represented as $1-p_{traffic}$. The association value selected from the first candidate association values, which may be greater than or equal to the association value threshold, may be represented as $c_{r_1,r_2}$, $c_{r_1,r_3}$, . . . $c_{r_1,r_u}$, $c_{r_2,r_3}$, $c_{4_2,r_4}$, . . . $c_{r_2,r_u}$, . . . $c_{r_{u-1},r_u}$. In this expression, $r_i$ represents the dangerous travel scene i. Two dangerous travel scenes corresponding to each of these association values may be determined as a positively associated dangerous travel scene pair, and a plurality of positively associated dangerous travel scene pairs constitute a positively associated dangerous travel scene pair set. That is, the positively associated dangerous travel scene pair set may be represented as: $\{(r_1, r_2), (r_1, r_3), \ldots, (r_1, r_u), (r_2, r_3), (r_2, r_4), \ldots (r_2, r_u), \ldots (r_{u-1}, r_u)\}$.

⑤ For the second candidate association values, an association value greater than or equal to the association value threshold may be selected from the plurality of second candidate association values. The association value selected from the second candidate association values may be represented as: $c_{s_1,s_2}$, $c_{s_1,s_3}$, . . . $c_{s_1,s_w}$, $c_{s_2,s_3}$, $c_{s_2,s_4}$, $c_{s_2,s_w}$, . . . $c_{s_{w-1},s_w}$. In this expression, $s_i$ represents the dangerous travel scene i. Two dangerous travel scenes corresponding to each of these association values may be determined as a negatively associated dangerous travel scene pair, and a plurality of negatively associated dangerous travel scene pairs constitute a negatively associated dangerous travel scene pair set. The negatively associated dangerous travel scene pair set may be represented as: $\{(s_1, s_2), (s_1, s_3), \ldots (s_1, s_w), (s_2, s_3), (s_2, s_4), \ldots (s_2, s_w), \ldots (s_{w-1}, s_{w2})\}$. A dangerous travel scene $s_i$ involved in the negatively associated dangerous travel scene pair set herein and a dangerous travel scene $r_i$ involved in the above positively associated dangerous travel scene pair set may be both dangerous travel scenes included in N dangerous travel scenes. In order to distinguish between positively and negatively associated travel scenes, different symbols may be used to represent the scenes in an example of the present subject matter.

Step S603. Determine an associated dangerous travel scene correlated to the target dangerous travel scene according to the positively associated dangerous travel scene pair set and the negatively associated dangerous travel scene pair set.

In some examples, before performing step S603, it may be determined whether the target dangerous travel scene may be any one of the dangerous travel scenes involved in the positively associated dangerous travel scene pair set. If no, it may be determined that there may be no associated dangerous travel scene correlated to the target dangerous travel scene. If yes, step S603 may be performed.

In some examples, the associated dangerous travel scene correlated to the target dangerous travel scene includes a positively associated dangerous travel scene, and the operation of determining an associated dangerous travel scene correlated to the target dangerous travel scene according to the positively associated dangerous travel scene pair set and the negatively associated dangerous travel scene pair set may include steps S61-S66: S61. Perform positively associated scene analysis on the target dangerous travel scene based on the positively associated dangerous travel scene pair set to obtain a positively associated dangerous travel scene set positively correlated to the target dangerous travel scene. S62. Select an unselected dangerous travel scene from the positively associated dangerous travel scene set as a currently traversed dangerous travel scene in a current traversal flow. The unselected dangerous travel scene may be a dangerous travel scene that may not selected as the positively associated dangerous travel scene. S63. Perform negatively associated scene analysis on the currently traversed dangerous travel scene based on the negatively associated dangerous travel scene pair set, to obtain a negatively associated dangerous travel scene set corresponding to the currently traversed dangerous travel scene. S64. Delete each dangerous travel scene included in the negatively associated dangerous travel scene set from the positively associated dangerous travel scene set, to update the positively associated dangerous travel scene set. S65. Repeatedly execute the above traversal flow, i.e. continue to select a new unselected dangerous travel scene from the positively associated dangerous travel scene set if an unselected dangerous travel scene exists in the deleted positively associated dangerous travel scene set, and take the new unselected dangerous travel scene as a currently traversed dangerous travel scene. S66. Select an associated dangerous travel scene correlated to the target dangerous travel scene from the deleted positively associated dangerous travel scene set if no unselected dangerous travel scene exists in the deleted positively associated dangerous travel scene set.

The implementation of steps S61-S66 may be specifically described below:

In step S61, the operation of performing positively associated scene analysis on the target dangerous travel scene based on the positively associated dangerous travel scene pair set to obtain an associated dangerous travel scene set positively correlated to the target dangerous travel scene includes:

determining a target positively associated dangerous travel scene pair including the target dangerous travel scene from the positively associated dangerous travel scene pair set; acquiring a plurality of dangerous travel scenes involved in the target positively associated dangerous travel scene pair, and recursively analyzing remaining dangerous travel scenes except the target dangerous travel scene in the plurality of dangerous travel scenes, to obtain a positively associated scene subset corresponding to the remaining dangerous travel scenes; and performing a union taking operation on a positively associated scene subset corresponding to the remaining dangerous travel scenes and the plurality of dangerous travel scenes involved in the target positively associated dangerous travel scene pair, to obtain the associated dangerous travel scene set.

In brief, it may be assumed that the target dangerous travel scene may be represented as t, and the positively associated dangerous travel scene pair set may be represented as: $\{(r_1,r_2), (r_1,r_3), \ldots, (r_1,r_5), (r_2,r_3), (r_2,r_4), \ldots (r_2,r_5)\}$. Assuming that $t=r_4$, the step of determining a positively associated dangerous travel scene set positively correlated to the target dangerous travel scene may be: selecting all target positively associated dangerous travel scene pairs including $r_4$ from the above positively associated dangerous travel scene pair set. The target positively associated dangerous travel scene pair may be represented as: $(r_1,r_4)$, $(r_2,r_4)$, $(r_3,r_4)$, and $(r_4,r_5)$. The plurality of dangerous travel scenes involved in the target positively associated dangerous travel scene pair may be represented by the following formulas: $r_1$, $r_2$, $r_3$, $r_4$, and $r_5$.

$r_1$, $r_2$ and $r_5$ may be recursively analyzed in the above five dangerous travel scenes to find positively associated dangerous travel scene pairs respectively including $r_1$, $r_2$ and $r_5$ in the positively associated dangerous travel scene pair set, and a plurality of dangerous travel scenes involved in the positively associated dangerous travel scene pairs corresponding to $r_1$, $r_2$ and $r_5$ may be then determined as respective positively associated scene subsets. That is, the positively associated scene subset corresponding to $r_1$ may be $(r_1, r_2, r_3, r_4, r_5)$, the positively associated scene subset corresponding to $r_2$ may be $(r_1, r_2, r_3, r_4, r_5)$, the positively associated scene subset corresponding to $r_5$ may be $(r_1, r_2, r_3, r_4, r_5)$, and union taking processing may be performed on the various positively associated scene subsets and the plurality of dangerous travel scenes $(r_1, r_2, r_3, r_4, r_5)$ involved in the target positively associated dangerous travel scene pair, to obtain a positively associated dangerous travel scene set represented as $(r_1, r_2, r_3, r_4, r_5)$.

After the positively associated dangerous travel scene set may be determined in S61, a traversal flow for updating the positively associated dangerous travel scene may be entered. The traversal flow may specifically include steps S62-S66. The currently traversed dangerous travel scene selected in step S62 may be any one of the unselected dangerous travel scenes in the positively associated dangerous travel scene set. It may be assumed that in a traversal flow, the currently traversed dangerous travel scene selected in step S62 may be represented as $r_2$, and it may be assumed that the negatively associated dangerous travel scene pair may be represented as: $\{(s_1, s_2), (s_1, s_3), (s_2, s_3)\}$.

It may be seen that the negatively associated dangerous travel scene involved in the negatively associated dangerous travel scene pair may be represented as $s_1$, $s_2$, $s_3$. Then, a negatively associated dangerous travel scene set corresponding to the currently traversed dangerous travel scene may be selected in step S63. The target dangerous travel scene may not included in the negatively associated dangerous travel scene set corresponding to the currently traversed dangerous travel scene.

In step S63, the information processing device first determines whether the target dangerous travel scene may be included in the dangerous travel scene involved in the negatively associated dangerous travel scene pair. If no, no operation needs to be performed. If yes, a dangerous travel scene including a target dangerous travel scene $r_2$ may be selected from the negatively associated dangerous travel scene pair set. Assuming that $r_2=s_2$ and the negatively associated dangerous travel scene pair including $s_2$ in the negatively associated dangerous travel scene pair set includes $(s_1, s_2)$ and $(s_2, s_3)$, the negatively associated dangerous travel scene set corresponding to the target dangerous travel scene $r_2$ may be represented as $(s_1, s_3)$.

Then, the dangerous travel scene included in the negatively associated dangerous travel scene set may be deleted from the positively associated dangerous travel scene set in step S64, to update the positively associated dangerous travel scene set. Specifically, if any one dangerous travel scene in the negatively associated dangerous travel scene set may be included in the positively associated dangerous travel scene set, this dangerous travel scene may be deleted. If there may be no dangerous travel scene in any one negatively associated dangerous travel scene set, the positively associated dangerous travel scene set may be maintained unchanged.

Next, in step S65, if it may be determined whether the updated positively associated dangerous travel scene further includes a traversal process which has not undergone step S62 and step S63, steps S62-S63 may be repeatedly performed. If all the dangerous travel scenes in the updated positively associated dangerous travel scene may be traversed, the traversal flow may be ended, and the positively associated dangerous travel scene correlated to the target dangerous travel scene may be selected from the updated positively associated dangerous travel scene set in step S66. Preferably, in a case that available resources of the information processing device may be sufficient, all dangerous travel scenes in the positively associated dangerous travel scene set may be taken as the positively associated dangerous travel scene correlated to the target dangerous travel scene. Prompting more positively associated dangerous travel scenes may improve travel safety.

In some examples, the associated dangerous travel scene correlated to the target dangerous travel scene further includes a negatively associated dangerous travel scene. In the above traversal flow of steps S62-S66, the negatively associated dangerous travel scenes corresponding to the target dangerous travel scene obtained by each traversal may be subjected to a union taking operation, and the negatively associated dangerous travel scene may be selected from a union taking operation result.

Step S604. Output dangerous travel prompt information according to the existence of the target dangerous travel scene and the associated dangerous travel scene on the target road section.

In some examples, some feasible implementations included in step S604 may be described with reference to the relevant description of the example of FIG. 2 and will not be described in detail herein.

In an example of the present subject matter, the information processing device determines a positively associated dangerous travel scene pair set and a negatively associated dangerous travel scene pair set according to the detection record corresponding to each of the N dangerous travel scenes in advance. When transport means travels on a target road section, if a target dangerous travel scene needing to be prompted may be acquired, a positively associated dangerous travel scene and a negative associated dangerous travel scene correlated to the target dangerous travel scene may be determined according to the positively associated dangerous travel scene pair set and the negatively associated dangerous travel scene pair set. Finally, prompt information indicating the existence of the target dangerous travel scene and the positively associated dangerous travel scene and the negative associated dangerous travel scene correlated to the target dangerous travel scene on the target road section may be output. In the above information processing process, considering the association among various dangerous travel scenes, not only a target dangerous travel scene needing to be prompted may be prompted, but also a positively associated dangerous travel scene with a larger association with the target dangerous travel scene and a negatively associated dangerous travel scene with a smaller association to the target dangerous travel scene may be effectively screened out, and these dangerous travel scenes may be prompted together, to improve the scene prompt efficiency and thus improve the travel safety of the transport means.

Figure 7:
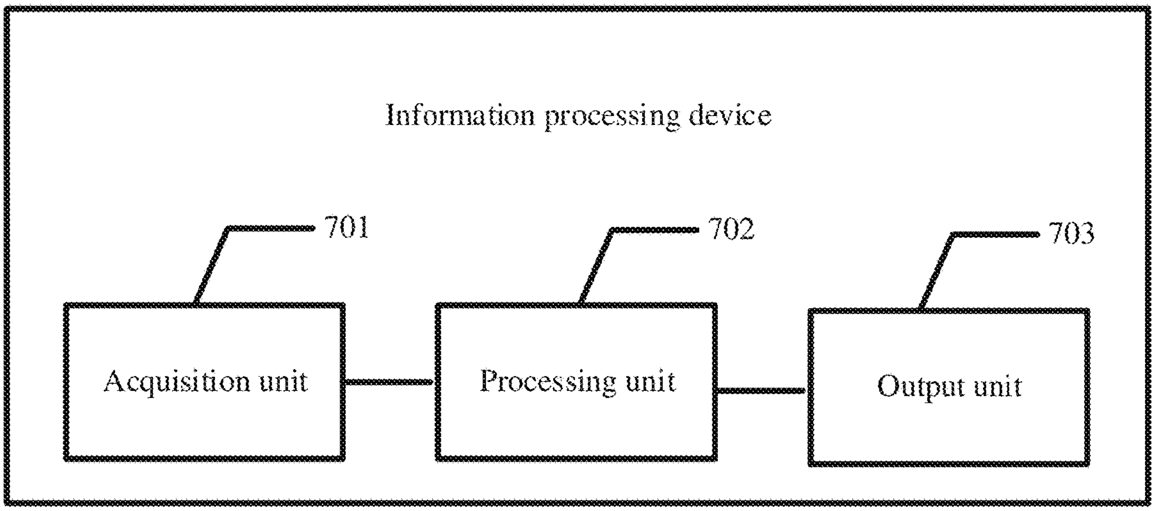
FIG. 7 is a schematic structural diagram of an information processing apparatus according to an example of the present subject matter.

Based on the above system example and method example, an example of the present subject matter also provides an information processing apparatus. Referring to FIG. 7, a schematic structural diagram of an information processing apparatus according to an example of the present subject matter is shown. The information processing apparatus shown in FIG. 7 may operate the following units: an acquisition unit 701, configured to acquire a target dangerous travel scene existing on a target road section; the acquisition unit 701, further configured to acquire reference information corresponding to the target road section, the reference information being determined according to a detection record corresponding to each of N dangerous travel scenes detected on the target road section within a time period, N being an integer greater than 1, the detection record corresponding to each dangerous travel scene being configured to reflect time at which the corresponding dangerous travel scene may be detected; and a processing unit 702, configured to determine an associated dangerous travel scene correlated to the target dangerous travel scene from the N dangerous travel scenes according to the reference information.

In some examples, the reference information includes a detection record corresponding to each of N dangerous travel scenes detected on the target road section within the target time period.

Alternatively, the reference information includes a positively associated dangerous travel scene pair set and a negatively associated dangerous travel scene pair set, and the positively associated dangerous travel scene pair set and the negatively associated dangerous travel scene pair set may be determined based on a detection record corresponding to each of the N dangerous travel scenes. Each positively associated dangerous travel scene pair in the positively associated dangerous travel scene pair set corresponds to an association value, and each negatively associated dangerous travel scene pair in the negatively associated dangerous travel scene pair set corresponds to an association value. The association value between two dangerous travel scenes included in each positively associated dangerous travel scene pair may be greater than or equal to an association value threshold that may be an integer, the association value between two dangerous travel scenes included in each negatively associated dangerous travel scene pair may be a negative number, and an absolute value of the association value corresponding to each negatively associated dangerous travel scene pair may be greater than or equal to the association value threshold.

Two dangerous travel scenes included in one positively associated dangerous travel scene pair may be allowed to exist simultaneously, and a probability that the two dangerous travel scenes included in the positively associated dangerous travel scene pair exist simultaneously may be positively correlated to a corresponding first association value. Two dangerous travel scenes included in one negatively associated dangerous travel scene pair may be not allowed to exist simultaneously.

In some examples, the reference information includes a detection record corresponding to each of N dangerous travel scenes detected on the target road section within the target time period, and the associated dangerous travel scene includes positively associated dangerous travel scenes. When determining an associated dangerous travel scene correlated to the target dangerous travel scene from the N dangerous travel scenes according to the reference information, the processing unit 702 may be configured to perform the following steps: determining, according to a detection record corresponding to each dangerous travel scene, a count of each of the dangerous travel scenes being detected within the target time period; and determining a positively associated dangerous travel scene correlated to the target dangerous travel scene from the N dangerous travel scenes according to the count of each of the dangerous travel scenes being detected within the target time period.

In some examples, when determining a positively associated dangerous travel scene correlated to the target dangerous travel scene from the N dangerous travel scenes according to the count of each of the dangerous travel scenes being detected within the target time period, the processing unit 702 may be configured to perform the following steps: determining M dangerous travel scenes detected within the target time period by a count greater than a count threshold according to the count of each dangerous travel scene being detected within the target time period, M being an integer and $1 \leq M < N$; determining an association value between each of the M dangerous travel scenes and the target dangerous travel scene; and selecting a dangerous travel scene having the association value greater than the association value threshold as a positively associated dangerous travel scene correlated to the target dangerous travel scene.

In some examples, the reference information includes a detection record corresponding to each of N dangerous travel scenes detected on the target road section within the target time period, and when determining an associated dangerous travel scene correlated to the target dangerous travel scene from the N dangerous travel scenes according to the reference information, the processing unit 702 may be configured to perform the following steps: determining, according to a detection record corresponding to each dangerous travel scene, a count of each of the dangerous travel scenes being detected within the target time period, and determining a count of the target dangerous travel scene being detected within the target time period; determining an association value between the target dangerous travel scene and each of the dangerous travel scenes based on the count of the target dangerous travel scene being detected within the target time period and the count of each dangerous travel scene being detected within the target time period, to obtain a first-type association value set; determining, according to a count of any two of the N dangerous travel scenes being detected within the target time period, an association value between any two dangerous travel scenes, to obtain a second-type association value set; and determining an associated dangerous travel scene correlated to the target dangerous travel scene from the N dangerous travel scenes according to at least one of the first-type association value set and the second-type association value set.

In some examples, the associated dangerous travel scene includes a positively associated dangerous travel scene, and when determining an associated dangerous travel scene correlated to the target dangerous travel scene from the N dangerous travel scenes according to at least one of the first-type association value set and the second-type association value set, the processing unit 702 may be configured to perform the following steps: adding a dangerous travel scene involved in an association value greater than or equal to a first association value threshold in the first-type association value set to a first associated scene subset; determining a second associated scene subset corresponding to each dangerous travel scene in the first associated scene subset from the N dangerous travel scenes based on the second-type association value set; and performing a union taking operation on the first associated scene subset and the second associated scene subset corresponding to each dangerous travel scene in the first associated scene subset, and determining a positively associated dangerous travel scene correlated to the target dangerous travel scene from a union taking operation result.

In some examples, the associated dangerous travel scene includes a negatively associated dangerous travel scene, and when determining an associated dangerous travel scene correlated to the target dangerous travel scene from the N dangerous travel scenes according to at least one of the first-type association value set and the second-type association value set, the processing unit 702 may be configured to perform the following steps: determining a dangerous travel scene involved in an association value that may be less than 0 and has an absolute value greater than the association value threshold in the first-type association value set as a negatively associated dangerous travel scene correlated to the target dangerous travel scene.

In some examples, the first associated scene subset includes a first dangerous travel scene, the N dangerous travel scenes include a second dangerous travel scene, and when determining a second associated scene subset corresponding to each dangerous travel scene in the first associated scene subset from the N dangerous travel scenes based on the second-type association value set, the processing unit 702 may be configured to perform the following steps: determining an association value between the first dangerous travel scene and the second dangerous travel scene based on the second-type association value set; and adding the second dangerous travel scene to a second associated scene subset corresponding to the first dangerous travel scene when the association value between the first dangerous travel scene and the second dangerous travel scene may be greater than or equal to a first association value threshold and an association value between the second dangerous travel scene and the target dangerous travel scene in the first-type association value set may be greater than a second association value threshold.

In some examples, the reference information includes a positively associated dangerous travel scene pair set and a negatively associated dangerous travel scene pair set, the associated dangerous travel scene correlated to the target dangerous travel scene includes a positively associated dangerous travel scene, and when determining an associated dangerous travel scene correlated to the target dangerous travel scene from the N dangerous travel scenes according to the reference information, the processing unit 702 may be configured to perform the following steps: performing positively associated scene analysis on the target dangerous travel scene based on the positively associated dangerous travel scene pair set when the target dangerous travel scene belongs to the positively associated dangerous travel scene pair set, to obtain a positively associated dangerous travel scene set positively correlated to the target dangerous travel scene; selecting an unselected dangerous travel scene from the positively associated dangerous travel scene set as a currently traversed dangerous travel scene, the unselected dangerous travel scene being a dangerous travel scene that may not selected as the positively associated dangerous travel scene; performing negatively associated scene analysis on the currently traversed dangerous travel scene based on the negatively associated dangerous travel scene pair set, to obtain a negatively associated dangerous travel scene set corresponding to the currently traversed dangerous travel scene; deleting each dangerous travel scene included in the negatively associated dangerous travel scene set from the positively associated dangerous travel scene set, to obtain the deleted positively associated dangerous travel scene set; continuing to select a new unselected dangerous travel scene from the positively associated dangerous travel scene set when an unselected dangerous travel scene exists in the deleted positively associated dangerous travel scene set, and taking the new unselected dangerous travel scene as a currently traversed dangerous travel scene; and selecting a positively associated dangerous travel scene correlated to the target dangerous travel scene from the deleted positively associated dangerous travel scene set when no unselected dangerous travel scene exists in the deleted positively associated dangerous travel scene set.

In some examples, the associated dangerous travel scene correlated to the target dangerous travel scene includes a negatively associated dangerous travel scene, and when determining an associated dangerous travel scene correlated to the target dangerous travel scene from the N dangerous travel scenes according to the reference information, the processing unit 702 may be configured to perform the following steps: performing a union taking operation on the negatively associated dangerous travel scene set corresponding to the currently traversed dangerous travel scene in each traversal flow; and selecting a negatively associated dangerous travel scene from a union taking operation result.

In some examples, when performing positively associated scene analysis on the target dangerous travel scene based on the positively associated dangerous travel scene pair set to obtain a positively associated dangerous travel scene set positively correlated to the target dangerous travel scene, the processing unit 702 may be configured to perform the following steps: determining a target positively associated dangerous travel scene pair including the target dangerous travel scene from the positively associated dangerous travel scene pair set; acquiring a plurality of dangerous travel scenes involved in the target positively associated dangerous travel scene pair, and recursively analyzing remaining dangerous travel scenes except the target dangerous travel scene in the plurality of dangerous travel scenes, to obtain a positively associated scene subset corresponding to the remaining dangerous travel scenes; and performing a union taking operation on a positively associated scene subset corresponding to the remaining dangerous travel scenes and the plurality of dangerous travel scenes involved in the target positively associated dangerous travel scene pair, to obtain the positively associated dangerous travel scene set.

In some examples, when acquiring a target dangerous travel scene existing on a target road section, the acquisition unit 701 may be configured to perform the following steps: acquiring, when transport means travels on a target road section and there may be a trigger event prompting a dangerous travel scene, a dangerous travel scene indicated by the trigger event as a target dangerous travel scene existing on the target road section.

In some examples, the trigger event includes receiving a prompt instruction of the dangerous travel scene transmitted by a travel management device of the transport means, and the target dangerous travel scene indicated by the trigger event may be a dangerous travel scene carried by the prompt instruction.

In some examples, the trigger event includes a trigger instruction for triggering the display of prompt information of the dangerous travel scene, and when acquiring a dangerous travel scene indicated by the trigger event as a target dangerous travel scene existing on the target road section, the acquisition unit 701 may be configured to perform the following steps: acquiring a detection record of each of N dangerous travel scenes detected on the target road section within the target time period; determining, according to the detection record of each dangerous travel scene, a count of each of the dangerous travel scenes being detected within the target time period; and determining a dangerous travel scene detected by a count greater than a count threshold as the dangerous travel scene indicated by the trigger event, and determining the dangerous travel scene indicated by the trigger event as the target dangerous travel scene.

In some examples, the information processing device further includes an output unit 704. The output unit 704 may be configured to: output dangerous travel prompt information based on the target dangerous travel scene and the associated dangerous travel scene, the dangerous travel prompt information including any one or more of the following: the target dangerous travel scene and the associated dangerous travel scene.

According to some examples of the present subject matter, the various steps involved in the information processing methods shown in FIG. 2, FIG. 4 and FIG. 6 may be performed by the various units of the information processing apparatus shown in FIG. 7. For example, step S201 and step S202 of FIG. 2 may be performed by the acquisition unit 801 of the information processing apparatus in FIG. 7, and step S203 may be performed by the processing unit 702 in the information processing apparatus of FIG. 7. In another example, step S401 and step S402 shown in FIG. 4 may be performed by the acquisition unit 701 in the information processing apparatus shown in FIG. 7, step S403 may be performed by the processing unit 702 in the information processing apparatus shown in FIG. 7, and step S404 may be performed by the output unit 703 in the information processing apparatus shown in FIG. 7. In another example, step S601 and step S602 shown in FIG. 6 may be performed by the acquisition unit 701 in the information processing apparatus shown in FIG. 7, step S603 may be performed by the processing unit 702 in the information processing apparatus shown in FIG. 7, and step S604 may be performed by the output unit 703 in the information processing apparatus shown in FIG. 7.

According to some other examples of the present subject matter, units of the information processing apparatus shown in FIG. 7 may be separately or wholly combined into one or several other units, or one (or more) of the units herein may further be divided into multiple units of smaller functions. In this way, same operations may be implemented, and implementation of the technical effects of the examples of the present subject matter may not affected. The foregoing units may be divided based on logical functions. In an actual application, a function of one unit may also be implemented by a plurality of units, or functions of a plurality of units may be implemented by one unit. In another example of the present subject matter, the information processing apparatus may also include other units. In an actual application, the functions may also be cooperatively implemented by other units and may be cooperatively implemented by a plurality of units.

Figure 8:
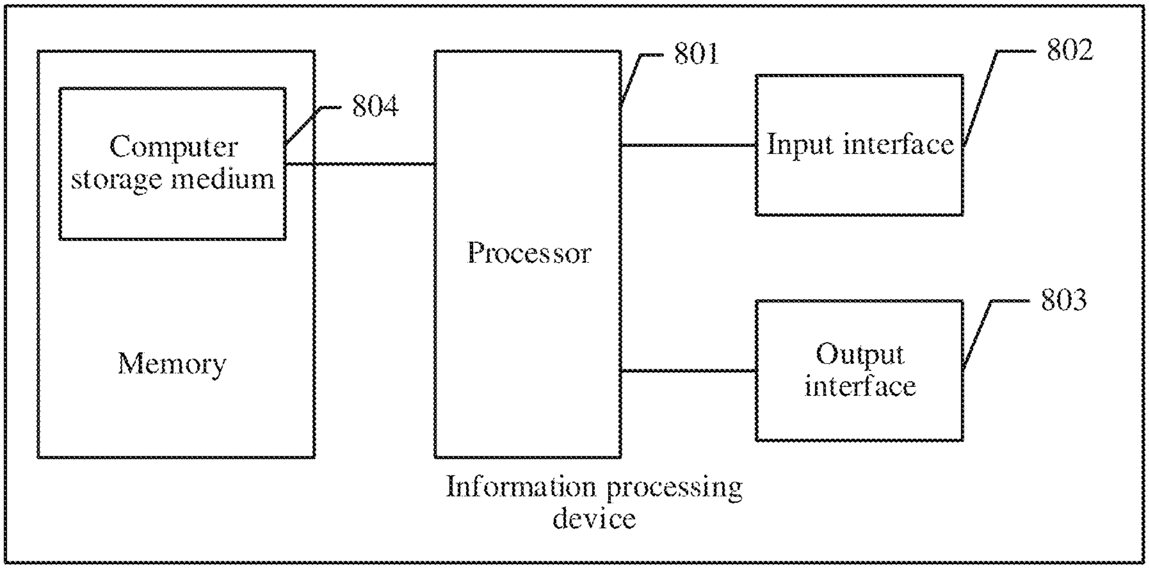
FIG. 8 is a schematic structural diagram of an information processing device according to an example of the present subject matter.

According to some other examples of the present subject matter, a computer program (including program code) that may perform the steps in the corresponding methods shown in FIG. 2, FIG. 4, and FIG. 6 may be run on a general computing device, such as a computer, which include processing elements and storage elements such as a central processing unit (CPU), a random access memory (RAM), and a read-only memory (ROM), to construct the information processing apparatus shown in FIG. 8, and implement the information processing method in the examples of the present subject matter. The computer program may be recorded in, for example, a non-transitory computer-readable storage medium, and may be loaded into the foregoing computing device by using the non-transitory computer-readable storage medium, and run in the computing device.

In an example of the present subject matter, when transport means travels on a target road section and if there may be a trigger event prompting a dangerous travel scene, a target dangerous travel scene indicated by the trigger event may be acquired. Further, reference information corresponding to the target road section may be acquired, and an associated dangerous travel scene correlated to the target dangerous travel scene is determined from N dangerous travel scenes according to the reference information. Then, prompt information indicating the existence of the target dangerous travel scene and the associated dangerous travel scene on the target road section may be output. In the above process, the information processing device may not only prompt the existence of the target dangerous travel scene, but also prompt the associated dangerous travel scene associated with the target dangerous travel scene. Prompting more dangerous travel scenes may avoid more accidents, and may improve the travel safety of transport means.

Based on the above method example and apparatus example, an example of the present subject matter also provides an information processing device. Referring to FIG. 8, a schematic structural diagram of an information processing device according to an example of the present subject matter may be shown. The information processing device shown in FIG. 8 may at least include a processor 801, an input interface 802, an output interface 803, and a computer storage medium 804. The processor 801, the input interface 802, the output interface 803, and the computer storage medium 804 may be connected by a bus or in another manner.

The computer storage medium 804 may be stored in a memory of the information processing device. The computing storage medium 804 may be configured to store a computer program. The computer program includes program instructions. The processor 801 may be configured to execute the program instructions stored in the computer storage medium 804. The processor 801 (or referred to as a central processing unit (CPU)) may be a computing core and a control core of the information processing device, may be suitable for implementing one or more instructions, and may be specifically suitable for loading and executing the one or more instructions to implement a corresponding method procedure or a corresponding function. In some examples, the processor 801 according to an example of the present subject matter may be configured to:

acquire a target dangerous travel scene existing on a target road section; acquire reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene may be detected; and determine an associated dangerous travel scene correlated to the target dangerous travel scene from the N dangerous travel scenes according to the reference information.

An example of the present subject matter further provides a computer storage medium, and the computer storage medium may be a memory device in an information processing device and may be configured to store programs and data. It may be understood that the computer storage medium herein may include an internal storage medium of the information processing device and certainly may also include an extended storage medium supported by the information processing device. The computer storage medium provides storage space, and the storage space stores an operating system of the information processing device. In addition, the storage space further stores one or more instructions suitable for being loaded and executed by the processor 801. The instructions may be one or more computer programs (including program code). The computer storage medium herein may be a high-speed RAM memory, or may be a non-volatile memory, such as at least one magnetic disk storage. Optionally, the computer storage medium may be at least one computer storage medium far away from the foregoing processor.

In some examples, one or more second instructions stored in the computer storage medium may be loaded and executed by the processor 801 to implement corresponding steps of the method in the examples of the information processing method shown in FIG. 2, FIG. 4, and FIG. 6. In a specific implementation, the one or more instructions in the computer storage medium may be loaded by the processor 801 to perform the following steps: acquiring a target dangerous travel scene existing on a target road section; acquiring reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene may be detected; and determining an associated dangerous travel scene correlated to the target dangerous travel scene from the N dangerous travel scenes according to the reference information.

In some examples, the reference information includes a detection record corresponding to each of N dangerous travel scenes detected on the target road section within the target time period. Alternatively, the reference information includes a positively associated dangerous travel scene pair set and a negatively associated dangerous travel scene pair set, and the positively associated dangerous travel scene pair set and the negatively associated dangerous travel scene pair set may be determined based on a detection record corresponding to each of the N dangerous travel scenes. Each positively associated dangerous travel scene pair in the positively associated dangerous travel scene pair set corresponds to an association value, and each negatively associated dangerous travel scene pair in the negatively associated dangerous travel scene pair set corresponds to an association value. The association value corresponding to each positively associated dangerous travel scene pair may be greater than or equal to an association value threshold that may be an integer, the association value corresponding to each negatively associated dangerous travel scene pair may be a negative number, and an absolute value of the association value corresponding to each negatively associated dangerous travel scene pair may be greater than or equal to the association value threshold. Two dangerous travel scenes included in one positively associated dangerous travel scene pair may be allowed to exist simultaneously, and a probability that the two dangerous travel scenes included in the positively associated dangerous travel scene pair exist simultaneously may be positively correlated to a corresponding first association value. Two dangerous travel scenes included in one negatively associated dangerous travel scene pair may be not allowed to exist simultaneously.

In some examples, the reference information includes a detection record corresponding to each of N dangerous travel scenes detected on the target road section within the target time period, and the associated dangerous travel scene includes positively associated dangerous travel scenes. When determining an associated dangerous travel scene correlated to the target dangerous travel scene from the N dangerous travel scenes according to the reference information, the processor 801 performs the following steps: determining, according to a detection record corresponding to each dangerous travel scene, a count of each of the dangerous travel scenes being detected within the target time period; and determining a positively associated dangerous travel scene correlated to the target dangerous travel scene from the N dangerous travel scenes according to the count of each of the dangerous travel scenes being detected within the target time period.

In some examples, when determining a positively associated dangerous travel scene correlated to the target dangerous travel scene from the N dangerous travel scenes according to the count of each of the dangerous travel scenes being detected within the target time period, the processor 801 performs the following steps: determining M dangerous travel scenes detected within the target time period by a count greater than a count threshold according to the count of each dangerous travel scene being detected within the target time period, M being an integer and $1 \leq M < N$; determining an association value between each of the M dangerous travel scenes and the target dangerous travel scene; and selecting a dangerous travel scene having the association value greater than the association value threshold as a positively associated dangerous travel scene correlated to the target dangerous travel scene.

In some examples, the reference information includes a detection record corresponding to each of N dangerous travel scenes detected on the target road section within the target time period, and when determining an associated dangerous travel scene correlated to the target dangerous travel scene from the N dangerous travel scenes according to the reference information, the processor 801 performs the following steps: determining, according to a detection record corresponding to each dangerous travel scene, a count of each of the dangerous travel scenes being detected within the target time period, and determining a count of the target dangerous travel scene being detected within the target time period; determining an association value between the target dangerous travel scene and each of the dangerous travel scenes based on the count of the target dangerous travel scene being detected within the target time period and the count of each dangerous travel scene being detected within the target time period, to obtain a first-type association value set; determining, according to a count of any two of the N dangerous travel scenes being detected within the target time period, an association value between any two dangerous travel scenes, to obtain a second-type association value set; and determining an associated dangerous travel scene correlated to the target dangerous travel scene from the N dangerous travel scenes according to at least one of the first-type association value set and the second-type association value set.

In some examples, the associated dangerous travel scene includes a positively associated dangerous travel scene, and when determining an associated dangerous travel scene correlated to the target dangerous travel scene from the N dangerous travel scenes according to at least one of the first-type association value set and the second-type association value set, the processor 801 performs the following steps: adding a dangerous travel scene involved in an association value greater than or equal to a first association value threshold in the first-type association value set to a first associated scene subset; determining a second associated scene subset corresponding to each dangerous travel scene in the first associated scene subset from the N dangerous travel scenes based on the second-type association value set; and performing a union taking operation on the first associated scene subset and the second associated scene subset corresponding to each dangerous travel scene in the first associated scene subset, and determining a positively associated dangerous travel scene correlated to the target dangerous travel scene from a union taking operation result.

In some examples, the associated dangerous travel scene includes a negatively associated dangerous travel scene, and when determining an associated dangerous travel scene correlated to the target dangerous travel scene from the N dangerous travel scenes according to at least one of the first-type association value set and the second-type association value set, the processor 801 performs the following steps: determining a dangerous travel scene involved in an association value less than a second association value threshold in the first-type association value set as a negatively associated dangerous travel scene correlated to the target dangerous travel scene.

In some examples, the first associated scene subset includes a first dangerous travel scene, the N dangerous travel scenes include a second dangerous travel scene, and when determining a second associated scene subset corresponding to each dangerous travel scene in the first associated scene subset from the N dangerous travel scenes based on the second-type association value set, the processor 801 performs the following steps: determining an association value between the first dangerous travel scene and the second dangerous travel scene based on the second-type association value; and adding the second dangerous travel scene to a second associated scene subset corresponding to the first dangerous travel scene when the association value between the first dangerous travel scene and the second dangerous travel scene may be greater than or equal to a first association value threshold and an association value between the second dangerous travel scene and the target dangerous travel scene in the first-type association value set satisfies an association value condition.

In some examples, the reference information includes a positively associated dangerous travel scene pair set and a negatively associated dangerous travel scene pair set, the associated dangerous travel scene correlated to the target dangerous travel scene includes a positively associated dangerous travel scene, and when determining an associated dangerous travel scene correlated to the target dangerous travel scene from the N dangerous travel scenes according to the reference information, the processor 801 performs the following steps: performing positively associated scene analysis on the target dangerous travel scene based on the positively associated dangerous travel scene pair set when the target dangerous travel scene belongs to the positively associated dangerous travel scene pair set, to obtain a positively associated dangerous travel scene set positively correlated to the target dangerous travel scene; selecting an unselected dangerous travel scene from the positively associated dangerous travel scene set as a dangerous travel scene in a current traversal flow, the unselected dangerous travel scene being a dangerous travel scene that is not selected as the positively associated dangerous travel scene; performing negatively associated scene analysis on the currently traversed dangerous travel scene based on the negatively associated dangerous travel scene pair set, to obtain a negatively associated dangerous travel scene set corresponding to the currently traversed dangerous travel scene; deleting each dangerous travel scene included in the negatively associated dangerous travel scene set from the positively associated dangerous travel scene set, to obtain the deleted positively associated dangerous travel scene set; continuing to select a new unselected dangerous travel scene from the positively associated dangerous travel scene set when an unselected dangerous travel scene exists in the deleted positively associated dangerous travel scene set, and taking the new unselected dangerous travel scene as a currently traversed dangerous travel scene; and selecting a positively associated dangerous travel scene correlated to the target dangerous travel scene from the deleted positively associated dangerous travel scene set if no unselected dangerous travel scene exists in the deleted positively associated dangerous travel scene set.

In some examples, the associated dangerous travel scene correlated to the target dangerous travel scene includes a negatively associated dangerous travel scene, and when determining an associated dangerous travel scene correlated to the target dangerous travel scene from the N dangerous travel scenes according to the reference information, the processor 801 performs the following steps: performing a union taking operation on the negatively associated dangerous travel scene set corresponding to the currently traversed target dangerous travel scene in each traversal flow; and selecting a negatively associated dangerous travel scene from a union taking operation result.

In some examples, when performing positively associated scene analysis on the target dangerous travel scene based on the positively associated dangerous travel scene pair set to obtain a positively associated dangerous travel scene set positively correlated to the target dangerous travel scene, the processor 801 performs the following steps: determining a target positively associated dangerous travel scene pair including the target dangerous travel scene from the positively associated dangerous travel scene pair set; acquiring a plurality of dangerous travel scenes involved in the target positively associated dangerous travel scene pair, and recursively analyzing remaining dangerous travel scenes except the target dangerous travel scene in the plurality of dangerous travel scenes, to obtain a positively associated scene subset corresponding to the remaining dangerous travel scenes; and performing a union taking operation on a positively associated scene subset corresponding to the remaining dangerous travel scenes and the plurality of dangerous travel scenes involved in the target positively associated dangerous travel scene pair, to obtain the positively associated dangerous travel scene set.

In some examples, when acquiring a target dangerous travel scene existing on a target road section, the processor 801 performs the following steps: when transport means travels on a target road section and if there may be a trigger event prompting a dangerous travel scene, acquiring a dangerous travel scene indicated by the trigger event as a target dangerous travel scene existing on the target road section.

In some examples, the trigger event includes receiving a prompt instruction of the dangerous travel scene transmitted by a travel management device of the transport means, and the target dangerous travel scene indicated by the trigger event may be a dangerous travel scene carried by the prompt instruction.

In some examples, the trigger event includes a trigger instruction for triggering the display of prompt information of the dangerous travel scene, and when acquiring a dangerous travel scene indicated by the trigger event as a target dangerous travel scene existing on the target road section, the processor 801 performs the following steps: acquiring a detection record of each of N dangerous travel scenes detected on the target road section within the target time period; determining, according to the detection record of each dangerous travel scene, a count of each of the dangerous travel scenes being detected within the target time period; and determining a dangerous travel scene detected by a count greater than a count threshold as the dangerous travel scene indicated by the trigger event, and determining the dangerous travel scene indicated by the trigger event as the target dangerous travel scene.

In some examples, the processor 801 may be further configured to output dangerous travel prompt information based on the target dangerous travel scene and the associated dangerous travel scene, the dangerous travel prompt information including any one or more of the following: the target dangerous travel scene and the associated dangerous travel scene.

In an example of the present subject matter, a target dangerous travel scene existing on a target road section may be acquired. Further, reference information corresponding to the target road section may be acquired, and an associated dangerous travel scene correlated to the target dangerous travel scene may be determined from N dangerous travel scenes according to the reference information. In the above process, the information processing device may determine an associated dangerous travel scene correlated to a target dangerous travel scene according to reference information on a target road section, so that when a dangerous travel scene needs to be prompted, the information processing device may not only prompt the existence of the target dangerous travel scene, but also prompt the associated dangerous travel scene associated with the target dangerous travel scene. Prompting more dangerous travel scenes may avoid more accidents, and may improve the travel safety of transport means.

According to an aspect of the present subject matter, an example of the present subject matter further provides a computer product or a computer program, including a computer instruction, the computer instruction being stored in a non-transitory computer-readable storage medium. The processor 801 reads the computer instruction from the non-transitory computer-readable storage medium. The processor 801 executes the computer instruction such that the image processing device performs the information processing methods shown in FIG. 2, FIG. 4 and FIG. 6, which specifically includes: acquiring a target dangerous travel scene existing on a target road section; acquiring reference information corresponding to the target road section, the reference information being determined according to a detection record corresponding to each of N dangerous travel scenes detected on the target road section within a time period, N being an integer greater than 1, the detection record corresponding to each dangerous travel scene being used for reflecting time at which the corresponding dangerous travel scene may be detected; and determining an associated dangerous travel scene correlated to the target dangerous travel scene from the N dangerous travel scenes according to the reference information.

In conclusion, with the present subject matter, an associated dangerous travel scene correlated to a target dangerous travel scene may be determined according to reference information on a target road section, so that when a dangerous travel scene needs to be prompted, not only the existence of the target dangerous travel scene may be prompted, but also the associated dangerous travel scene associated with the target dangerous travel scene may be prompted. Prompting more dangerous travel scenes may avoid more accidents, and may improve the travel safety of transport means.

The foregoing descriptions may be merely examples of the present subject matter and may be not intended to limit the protection scope of the present subject matter. Any modification, equivalent replacement, or improvement made without departing from the spirit and range of the present subject matter shall fall within the protection scope of the present subject matter.

What is claimed is:

1. An information processing method, comprising:

acquiring a target dangerous travel scene existing on a target road section;

acquiring reference information corresponding to the target road section, wherein the reference information is determined according to a detection record corresponding to each of a plurality of dangerous travel scenes detected on the target road section within a target time period, and the detection record corresponds to each dangerous travel scene is used for reflecting time at which the corresponding dangerous travel scene is detected; and determining an associated dangerous travel scene correlated to the target dangerous travel scene from the plurality of dangerous travel scenes according to the reference information, wherein determining the associated dangerous travel scene comprises determining that the associated dangerous travel scene comprises one of a positively associated dangerous travel scene correlated to the target dangerous travel scene and a negatively associated dangerous travel scene correlated to the target dangerous travel scene, wherein:

the reference information comprises a detection record corresponding to each of the plurality of dangerous travel scenes detected on the target road section within the target time period; or the reference information comprises a positively associated dangerous travel scene pair set and a negatively associated dangerous travel scene pair set, the positively associated dangerous travel scene pair set and the negatively associated dangerous travel scene pair set determined based on a detection record corresponding to each of the plurality of dangerous travel scenes;

each positively associated dangerous travel scene pair in the positively associated dangerous travel scene pair set corresponds to an association value, and each negatively associated dangerous travel scene pair in the negatively associated dangerous travel scene pair set corresponds to an association value, wherein the association value between two dangerous travel scenes comprised in each positively associated dangerous travel scene pair is greater than or equal to an association value threshold that is a positive number, the association value between two dangerous travel scenes comprised in each negatively associated dangerous travel scene pair is a negative number, and an absolute value of the association value corresponding to each negatively associated dangerous travel scene pair is greater than or equal to the association value threshold;

two dangerous travel scenes comprised in one positively associated dangerous travel scene pair are allowed to exist simultaneously;

a probability that the two dangerous travel scenes comprised in the positively associated dangerous travel scene pair exist simultaneously is positively correlated to a corresponding first association value; and two dangerous travel scenes comprised in one negatively associated dangerous travel scene pair are not allowed to exist simultaneously.

2. The method according to claim 1, wherein the reference information comprises a detection record corresponding to each of the plurality of dangerous travel scenes detected on the target road section within the target time period, and the associated dangerous travel scene comprises the positively associated dangerous travel scene, wherein the determining an associated dangerous travel scene correlated to the target dangerous travel scene from the plurality of dangerous travel scenes according to the reference information comprises:

determining, according to a detection record corresponding to each dangerous travel scene, a count of each of the dangerous travel scenes detected within the target time period; and determining the positively associated dangerous travel scene correlated to the target dangerous travel scene from the plurality of dangerous travel scenes according to the count of each of the dangerous travel scenes detected within the target time period.

3. The method according to claim 2, wherein the determining the positively associated dangerous travel scene correlated to the target dangerous travel scene from the plurality of dangerous travel scenes according to the count of each of the dangerous travel scenes detected within the target time period comprises:

determining M dangerous travel scenes detected within the target time period by a count greater than a count threshold according to the count of each dangerous travel scene is detected within the target time period, wherein M is an integer greater than one and less than a number of the plurality of dangerous travel scenes;

determining an association value between each of the M dangerous travel scenes and the target dangerous travel scene; and taking a dangerous travel scene having the association value greater than the association value threshold as the positively associated dangerous travel scene correlated to the target dangerous travel scene.

4. The method according to claim 1, wherein the reference information comprises a detection record corresponding to each of the plurality of dangerous travel scenes detected on the target road section within the target time period;

the determining an associated dangerous travel scene correlated to the target dangerous travel scene from the plurality of dangerous travel scenes according to the reference information comprises:

determining, according to a detection record corresponding to each dangerous travel scene, a count of each of the dangerous travel scenes detected within the target time period, and determining a count of the target dangerous travel scene detected within the target time period;

determining an association value between the target dangerous travel scene and each of the dangerous travel scenes based on:

the count of the target dangerous travel scene detected within the target time period, and the count of each dangerous travel scene detected within the target time period to obtain a first-type association value set;

determining, according to a count of any two of the plurality of dangerous travel scenes detected within the target time period, an association value between any two dangerous travel scenes, to obtain a second-type association value set; and determining an associated dangerous travel scene correlated to the target dangerous travel scene from the plurality of dangerous travel scenes according to at least one of the first-type association value set and the second-type association value set.

5. The method according to claim 4, wherein the associated dangerous travel scene comprises the positively associated dangerous travel scene; and the determining an associated dangerous travel scene correlated to the target dangerous travel scene from the plurality of dangerous travel scenes according to at least one of the first-type association value set and the second-type association value set comprises:

adding a dangerous travel scene involved in an association value greater than or equal to the association value threshold in the first-type association value set to a first associated scene subset;

determining a second associated scene subset corresponding to each dangerous travel scene in the first associated scene subset from the plurality of dangerous travel scenes based on the second-type association value set; and performing a union taking operation on the first associated scene subset and the second associated scene subset corresponding to each dangerous travel scene in the first associated scene subset, and determining the positively associated dangerous travel scene correlated to the target dangerous travel scene from a union taking operation result.

6. The method according to claim 5, wherein the first associated scene subset comprises a first dangerous travel scene, the plurality of dangerous travel scenes comprise a second dangerous travel scene, and the determining a second associated scene subset corresponding to each dangerous travel scene in the first associated scene subset from the plurality of dangerous travel scenes based on the second-type association value set comprises:

determining an association value between the first dangerous travel scene and the second dangerous travel scene based on the second-type association value set; and adding the second dangerous travel scene to a second associated scene subset corresponding to the first dangerous travel scene in a case that the association value between the first dangerous travel scene and the second dangerous travel scene is greater than or equal to the association value threshold and an association value between the second dangerous travel scene and the target dangerous travel scene in the first-type association value set satisfies an association condition.

7. The method according to claim 4, wherein the associated dangerous travel scene comprises the negatively associated dangerous travel scene; and the determining an associated dangerous travel scene correlated to the target dangerous travel scene from the plurality of dangerous travel scenes according to at least one of the first-type association value set and the second-type association value set comprises:

determining a dangerous travel scene involved in an association value that is less than 0 and has an absolute value greater than the association value threshold in the first-type association value set as the negatively associated dangerous travel scene correlated to the target dangerous travel scene.

8. The method according to claim 1, wherein the reference information comprises the positively associated dangerous travel scene pair set and the negatively associated dangerous travel scene pair set; and the associated dangerous travel scene correlated to the target dangerous travel scene comprises the positively associated dangerous travel scene, and the determining an associated dangerous travel scene correlated to the target dangerous travel scene from the plurality of dangerous travel scenes according to the reference information comprises:

performing positively associated scene analysis on the target dangerous travel scene based on the positively associated dangerous travel scene pair set when the target dangerous travel scene belongs to the positively associated dangerous travel scene pair set, to obtain a positively associated dangerous travel scene set positively correlated to the target dangerous travel scene;

selecting an unselected dangerous travel scene from the positively associated dangerous travel scene set as a currently traversed dangerous travel scene, wherein the unselected dangerous travel scene being a dangerous travel scene that is not selected as the positively associated dangerous travel scene;

performing negatively associated scene analysis on the currently traversed dangerous travel scene based on the negatively associated dangerous travel scene pair set, to obtain a negatively associated dangerous travel scene set corresponding to the currently traversed dangerous travel scene;

deleting each dangerous travel scene comprised in the negatively associated dangerous travel scene set from the positively associated dangerous travel scene set, to obtain a deleted positively associated dangerous travel scene set;

continuing to select a new unselected dangerous travel scene from the positively associated dangerous travel scene set when an unselected dangerous travel scene exists in the deleted positively associated dangerous travel scene set, and taking the new unselected dangerous travel scene as a currently traversed dangerous travel scene; and selecting the positively associated dangerous travel scene correlated to the target dangerous travel scene from the deleted positively associated dangerous travel scene set when no unselected dangerous travel scene exists in the deleted positively associated dangerous travel scene set.

9. The method according to claim 8, wherein the associated dangerous travel scene correlated to the target dangerous travel scene comprises the negatively associated dangerous travel scene, and the determining an associated dangerous travel scene correlated to the target dangerous travel scene from the plurality of dangerous travel scenes according to the reference information comprises:

performing a union taking operation on the negatively associated dangerous travel scene set corresponding to the currently traversed dangerous travel scene in each traversal flow; and selecting the negatively associated dangerous travel scene from a union taking operation result.

10. The method according to claim 8, wherein the performing of the positively associated scene analysis on the target dangerous travel scene based on the positively associated dangerous travel scene pair set to obtain a positively associated dangerous travel scene set positively correlated to the target dangerous travel scene comprises:

determining a target positively associated dangerous travel scene pair comprising the target dangerous travel scene from the positively associated dangerous travel scene pair set;

acquiring a set of dangerous travel scenes involved in the target positively associated dangerous travel scene pair;

recursively analyzing remaining dangerous travel scenes except the target dangerous travel scene in the set of dangerous travel scenes, to obtain a positively associated scene subset corresponding to the remaining dangerous travel scenes; and performing a union taking operation on a positively associated scene subset corresponding to the remaining dangerous travel scenes and the set of dangerous travel scenes involved in the target positively associated dangerous travel scene pair, to obtain the positively associated dangerous travel scene set.

11. The method according to claim 1, wherein the acquiring a target dangerous travel scene existing on a target road section comprises:

acquiring, in a case that transport means travels on a target road section and there is a trigger event prompting a dangerous travel scene, wherein a dangerous travel scene is indicated by the trigger event as a target dangerous travel scene existing on the target road section.

12. The method according to claim 11, wherein the trigger event comprises receiving a prompt instruction of the dangerous travel scene transmitted by a travel management device of the transport means, and the target dangerous travel scene indicated by the trigger event is a dangerous travel scene carried by the prompt instruction.

13. The method according to claim 11, wherein the trigger event comprises a trigger instruction for triggering display of prompt information of the dangerous travel scene, and the acquiring a dangerous travel scene indicated by the trigger event as a target dangerous travel scene existing on the target road section comprises:

acquiring a detection record of each of the plurality of dangerous travel scenes detected on the target road section within the target time period;

determining, according to the detection record of each dangerous travel scene, a count of each of the dangerous travel scenes detected within the target time period;

determining a dangerous travel scene detected by a count greater than a count threshold as the dangerous travel scene indicated by the trigger event; and determining the dangerous travel scene indicated by the trigger event as the target dangerous travel scene.

14. The method according to claim 1, further comprising:

performing a prompt operation according to the target dangerous travel scene and the associated dangerous travel scene by:

outputting dangerous travel prompt information based on the target dangerous travel scene and the associated dangerous travel scene comprising the one of the positively associated dangerous travel scene and the negatively associated dangerous travel scene, wherein the dangerous travel prompt information comprises any one or more of:

the target dangerous travel scene, and the associated dangerous travel scene.

15. The method of claim 1, wherein the positively associated dangerous travel scene is determined to have an existence probability greater than a predetermined threshold when the target dangerous travel scene exists, and the negatively associated dangerous travel scene is determined to have an existence probability less than the predetermined threshold when the target dangerous travel scene exists.

16. An information processing apparatus, comprising:

a memory storing a plurality of instructions; and a processor configured to execute the plurality of instructions, and upon execution of the plurality of instructions, is configured to:

acquire a target dangerous travel scene existing on a target road section;

acquire reference information corresponding to the target road section, wherein the reference information is determined according to a detection record corresponding to each of a plurality of dangerous travel scenes detected on the target road section within a time period, the detection record corresponding to each dangerous travel scene is configured to reflect time at which the corresponding dangerous travel scene is detected; and determine an associated dangerous travel scene correlated to the target dangerous travel scene from the plurality of dangerous travel scenes according to the reference information, wherein the determination of the associated dangerous travel scene comprises a determination that the associated dangerous travel scene comprises one of a positively associated dangerous travel scene correlated to the target dangerous travel scene and a negatively associated dangerous travel scene correlated to the target dangerous travel scene, wherein:

the reference information comprises a detection record corresponding to each of the plurality of dangerous travel scenes detected on the target road section within the target time period; or the reference information comprises a positively associated dangerous travel scene pair set and a negatively associated dangerous travel scene pair set, the positively associated dangerous travel scene pair set and the negatively associated dangerous travel scene pair set determined based on a detection record corresponding to each of the plurality of dangerous travel scenes;

each positively associated dangerous travel scene pair in the positively associated dangerous travel scene pair set corresponds to an association value, and each negatively associated dangerous travel scene pair in the negatively associated dangerous travel scene pair set corresponds to an association value, wherein the association value between two dangerous travel scenes comprised in each positively associated dangerous travel scene pair is greater than or equal to an association value threshold that is a positive number, the association value between two dangerous travel scenes comprised in each negatively associated dangerous travel scene pair is a negative number, and an absolute value of the association value corresponding to each negatively associated dangerous travel scene pair is greater than or equal to the association value threshold;

two dangerous travel scenes comprised in one positively associated dangerous travel scene pair are allowed to exist simultaneously;

a probability that the two dangerous travel scenes comprised in the positively associated dangerous travel scene pair exist simultaneously is positively correlated to a corresponding first association value; and two dangerous travel scenes comprised in one negatively associated dangerous travel scene pair are not allowed to exist simultaneously.

17. The information processing apparatus of claim 16, wherein the positively associated dangerous travel scene is determined to have an existence probability greater than a predetermined threshold when the target dangerous travel scene exists, and the negatively associated dangerous travel scene is determined to have an existence probability less than the predetermined threshold when the target dangerous travel scene exists.

18. A non-transitory computer-readable storage medium storing a plurality of instructions executable by a processor, and when executed by the processor, is configured to cause the processor to:

acquire a target dangerous travel scene existing on a target road section;

acquire reference information corresponding to the target road section, wherein the reference information is determined according to a detection record corresponding to each of a plurality of dangerous travel scenes detected on the target road section within a time period, the detection record corresponding to each dangerous travel scene is configured to reflect time at which the corresponding dangerous travel scene is detected; and determine an associated dangerous travel scene correlated to the target dangerous travel scene from the plurality of dangerous travel scenes according to the reference information, wherein the determination of the associated dangerous travel scene comprises a determination that the associated dangerous travel scene comprises one of a positively associated dangerous travel scene correlated to the target dangerous travel scene and a negatively associated dangerous travel scene correlated to the target dangerous travel scene, wherein:

the reference information comprises a detection record corresponding to each of the plurality of dangerous travel scenes detected on the target road section within the target time period; or the reference information comprises a positively associated dangerous travel scene pair set and a negatively associated dangerous travel scene pair set, the positively associated dangerous travel scene pair set and the negatively associated dangerous travel scene pair set determined based on a detection record corresponding to each of the plurality of dangerous travel scenes;

each positively associated dangerous travel scene pair in the positively associated dangerous travel scene pair set corresponds to an association value, and each negatively associated dangerous travel scene pair in the negatively associated dangerous travel scene pair set corresponds to an association value, wherein the association value between two dangerous travel scenes comprised in each positively associated dangerous travel scene pair is greater than or equal to an association value threshold that is a positive number, the association value between two dangerous travel scenes comprised in each negatively associated dangerous travel scene pair is a negative number, and an absolute value of the association value corresponding to each negatively associated dangerous travel scene pair is greater than or equal to the association value threshold;

two dangerous travel scenes comprised in one positively associated dangerous travel scene pair are allowed to exist simultaneously;

a probability that the two dangerous travel scenes comprised in the positively associated dangerous travel scene pair exist simultaneously is positively correlated to a corresponding first association value; and two dangerous travel scenes comprised in one negatively associated dangerous travel scene pair are not allowed to exist simultaneously.

19. The non-transitory computer readable storage medium of claim 18, wherein the positively associated dangerous travel scene is determined to have an existence probability greater than a predetermined threshold when the target dangerous travel scene exists, and the negatively associated dangerous travel scene is determined to have an existence probability less than the predetermined threshold when the target dangerous travel scene exists.

* * * * *